US010983966B2

(12) United States Patent
Hirzel et al.

(10) Patent No.: US 10,983,966 B2
(45) Date of Patent: Apr. 20, 2021

(54) DATABASE ALGEBRA AND COMPILER WITH ENVIRONMENTS

(71) Applicant: International Business Machines Corporation, Armonk, NY (US)

(72) Inventors: Martin J. Hirzel, Ossining, NY (US); Louis Mandel, New York, NY (US); Avraham E. Shinnar, Hawthorne, NY (US); Jerome Simeon, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 15/135,747

(22) Filed: Apr. 22, 2016

(65) Prior Publication Data

US 2017/0308555 A1 Oct. 26, 2017

(51) Int. Cl.
*G06F 7/00* (2006.01)
*G06F 16/00* (2019.01)
*G06F 16/21* (2019.01)
*G06F 16/242* (2019.01)

(52) U.S. Cl.
CPC .......... *G06F 16/211* (2019.01); *G06F 16/217* (2019.01); *G06F 16/2433* (2019.01)

(58) Field of Classification Search
CPC ......... G06F 17/30292; G06F 17/30306; G06F 17/30339; G06F 17/30312
See application file for complete search history.

(56) References Cited

U.S. PATENT DOCUMENTS

| 6,618,719 | B1* | 9/2003 | Andrei | G06F 16/24547 |
|---|---|---|---|---|
| 8,543,589 | B2 | 9/2013 | Khorlin et al. | |
| 2002/0133497 | A1* | 9/2002 | Draper | G06F 17/2205 |
| 2005/0210002 | A1* | 9/2005 | Pal | G06F 16/8358 |
| 2008/0082514 | A1* | 4/2008 | Khorlin | G06F 16/80 |
| 2009/0024622 | A1* | 1/2009 | Chkodrov | G06F 16/24542 |
| 2010/0036826 | A1* | 2/2010 | Khorlin | G06F 16/80 |
| | | | | 707/760 |
| 2011/0029508 | A1 | 2/2011 | Al-Omari et al. | |
| 2011/0289118 | A1* | 11/2011 | Chen | G06F 16/81 |
| | | | | 707/803 |
| 2013/0139164 | A1* | 5/2013 | Balko | G06F 8/35 |
| | | | | 718/102 |

(Continued)

OTHER PUBLICATIONS

A Pattern Calculus for Rule Languages: Expressiveness, Compilation, and Mechanization, Avraham Shinnar, Jérôme Siméon, and Martin Hirzel, ECOOP 2015, pp. 542-567 (Year: 2015).*

(Continued)

*Primary Examiner* — Tuan A Pham
(74) *Attorney, Agent, or Firm* — Scully, Scott, Murphy & Presser, P.C.; Vazken A. Alexanian

(57) ABSTRACT

Database compiler with environment support may be provided. Database operators in a database compiler may be extended to include environment as an input parameter in addition to input data for native environment support. Environment operators may be added to the database compiler, which perform one or more of accessing and modifying the environment. Environment operators may include a return-environment operator, a map-with-environment operator and a compose-with-environment operator.

18 Claims, 14 Drawing Sheets

(56) References Cited

U.S. PATENT DOCUMENTS

| | | | | |
|---|---|---|---|---|
| 2015/0378693 | A1* | 12/2015 | Boag | G06F 8/41 717/146 |
| 2016/0034478 | A1* | 2/2016 | Hernandez-Sherrington | G06F 16/2228 707/609 |
| 2016/0299748 | A1* | 10/2016 | Scholz | G06F 8/443 |

OTHER PUBLICATIONS

Algebraic Optimization of Object Oriented Query Languages, Catriel Beeri, Yoram Kornatzky, Theoretical Computer Sciense 116 (1993) 59-94 (Year: 1993).*

The Power of Languages for the Manipulation of Complex Values, Serge Abiteboul, Catriel Beeri. (Year: 1994).*

Aho, A.V., et al., "Efficient Optimization of a Class of Relational Expressions", ACM Transactions on Database Systems, Dec. 1979, pp. 435-454, vol. 4, No. 4.

Van Den Bussche, J., et al., "Polymorphic Type Inference for the Named Nested Relational Calculus", Transaction on Computational Logic, Jan. 2008, pp. 1-19, vol. 9, No. 1.

Arnborg, S., "A Simple Approach to Relational Algebra Query Language Design", An IP.com Prior Art Database Technical Disclosure, Dec. 30, 1899, 23 pages.

Cherniack, M., et al., "Rule Languages and Internal Algebras for Rule-Based Optimizers", ACM SIGMOD Record, Jun. 1996, pp. 401-412, vol. 25. No. 2, Montreal, Canada.

Cluet, S., et al., "Nested Queries in Object Bases", Workshop on Database Programming Languages (DBPL), Aug. 30-Sep. 1, 1993, pp. 226-242.

Kotlyar, V., et al., "Sparse code generation for imperfectly nested loops with dependences", ACM SIGARCH International Conference on Super-computing, Jul. 7-11, 1997, 8 pages, Vienna, Austria.

May, N., et al., "Strategies for Query Unnesting in XML Databases", ACM Transactions on Database Systems, Sep. 2006, pp. 968-1013, vol. 31, No. 3.

Mohan, C., "Recent and Future Trends in Distributed Data Base Management", An IP.com Prior Art Database Technical Disclosure, May 9, 1984, 23 pages.

Rodriguez-Muro, M., et al., "Efficient SPARQL-to-SQL with R2RML mappings", Journal of Web Semantics: Science, Services and Agents on the World Wide Web, Preprint submitted Mar. 4, 2014, 27 pages.

Shinnar, A., et al., "A Pattern Calculus for Rule Languages: Expressiveness, Compilation, and Mechanization", 29th European Conference on Object-Oriented Programming (ECOOP '15), Jul. 5-10, 2015, pp. 542-567, Prague, Czech Republic.

* cited by examiner

Source Rule:

```
when { C: Expr1 }
then { println(Expr2); }
```
                                    ← 202

Compiled NRA (before optimization):

204

$$flatten\left(\chi_{\{\{In.E\}\}}\left(\chi_{\{[E:In.E_2]*[D:In.D]\}}\right(\right.$$
$$\rho_{E_2/\{T_2\}}\left(\chi_{\{In*[T_2:In.E+In.E_1]\}}\right(\right.$$
$$\left.\left.\left.\rho_{E_1/\{T_1\}}\left(\{In*[T_1:\chi_{\{[C:In]\}}(\{In.D\})]\}\right)\right)\right)\right)\right)$$

Compiled NRA+Env (before optimization):

206

$$flatten\left(\chi^e_{\{\{Env\}\}}\right.$$
$$\left.\circ^e flatten\left(\chi_{\{In+Env\}}\left(\chi_{\{[C:In]\}}(\{In\})\right)\right)\right)$$

Compiled NRA+Env (after optimization):
                                                            208

$$\{[C:In]*Env\}$$

Fig. 2

$$
\begin{aligned}
q ::= \ &d & &\textit{constant data} \\
|\ &\text{In} & &\textit{context value} \\
|\ &\oplus q & &\textit{unary operator} \\
|\ &q_1 \otimes q_2 & &\textit{binary operator} \\
|\ &\chi\langle q_2\rangle(q_1) & &\textit{map} \\
|\ &\sigma\langle q_2\rangle(q_1) & &\textit{select} \\
|\ &q_1 \times q_2 & &\textit{cartesian product} \\
|\ &q_1 \bowtie q_2 & &\textit{join} \\
|\ &\bowtie^d\langle q2\rangle(q_1) & &\textit{dependent join} \\
|\ &q_2 \circ q_1 & &\textit{compose} \\
\end{aligned}
$$

*& groupby/semi-join/unnest....*

$$
\begin{aligned}
|\ &\text{Env} & &\textit{returns environment} \\
|\ &\chi^e\langle q_2\rangle(q_1) & &\textit{map with env} \\
|\ &q_2 \circ^e q_1 & &\textit{compose with env}
\end{aligned}
$$ ⎱ 302

$$[\![d]\!]_a = d$$
$$[\![\text{In}]\!]_a = \text{In}.D$$
$$[\![q_2 \circ q_1]\!]_a = [\![q_2]\!]_a \circ ([E : \text{In}.E] * [D : [\![q_1]\!]_a])$$
$$[\![\ominus q]\!]_a = \ominus [\![q]\!]_a$$
$$[\![q_1 \otimes q_2]\!]_a = [\![q_1]\!]_a \otimes [\![q_2]\!]_a$$
$$[\![\chi_{(q_2)}(q_1)]\!]_a = \chi_{([\![q_2]\!]_a)}(\rho_{D/\{T_1\}}([E : \text{In}.E] * [T_1 : [\![q_1]\!]_a]))$$
$$[\![\sigma_{(q_2)}(q_1)]\!]_a = \chi_{(\text{In}.D)}(\sigma_{([\![q_2]\!]_a)}(\rho_{D/\{T_1\}}([E : \text{In}.E] * [T_1 : [\![q_1]\!]_a])))$$
$$[\![q_1 \times q_2]\!]_a = [\![q_1]\!]_a \times [\![q_2]\!]_a$$
$$[\![\bowtie^d_{(q_2)}(q_1)]\!]_a = \chi_{(\text{In}.D*\text{In}.T_2)}\left(\bowtie^d_{(\chi_{(T_2.\text{In}_2)}([\![q_2]\!]_a))}(\rho_{D/\{T_1\}}([E : \text{In}.E] * [T_1 : [\![q_1]\!]_a]))\right)$$
$$[\![q_1 q_2]\!]_a = [\![q_1]\!][\![q_2]\!]$$
$$[\![(A) \, q]\!]_a = (A) \, [\![q]\!]_a$$
$$[\![\text{Env}]\!]_a = \text{In}.E$$
$$[\![q_2 \circ^e q_1]\!]_a = [\![q_2]\!]_a \circ ([E : [\![q_1]\!]_a] * [D : \text{In}.D])$$
$$[\![\chi^e_{(q_2)}]\!]_a = \chi_{([\![q_2]\!]_a)}(\rho_{E/\{T_1\}}([T_1 : \text{In}.E] * [D : \text{In}]))$$

From NRA$^e$ back to NRA $\boxed{[\![q]\!]_a = q'}$

Fig. 7

$$[\![d]\!]_r = \{d\}$$
$$[\![\odot p]\!]_r = \chi_{\langle \odot \mathrm{In}\rangle}([\![p]\!]_r)$$
$$[\![p_1 \oslash p_2]\!]_r = \chi_{\langle \mathrm{In}.T_1 \oslash \mathrm{In}.T_2\rangle}\bigl(\chi_{\langle T_1:\mathrm{In}\rangle}([\![p_1]\!]) \times \chi_{\langle T_2:\mathrm{In}\rangle}([\![p_2]\!])\bigr)$$
$$[\![\mathrm{map}\ p]\!]_r = \{flatten\,(\chi_{\{[\![p]\!]\}}(\mathrm{In}))\}$$
$$[\![\mathrm{assert}\ p]\!]_r = \chi_{\langle\{\}\rangle}(\sigma_{\langle \mathrm{In}\rangle}([\![p]\!]_r))$$
$$[\![p_1 | p_2]\!]_r = [\![p_1]\!] \| [\![p_2]\!]$$
$$[\![\mathrm{it}]\!]_r = \{\mathrm{In}\}$$
$$[\![\mathrm{let\ it} = p_1\ \mathrm{in}\ p_2]\!]_r = flatten\,(\chi_{\{[\![p_2]\!]\}}([\![p_1]\!]_r))$$
$$[\![\mathrm{cast}\ A]\!]_r = (A)\,(\mathrm{In})$$
$$[\![\mathrm{env}]\!]_r = \{\mathrm{Env}\}$$
$$[\![\mathrm{let\ env}\mathrel{+}= p_1\ \mathrm{in}\ p_2]\!]_r = flatten\Bigl(\chi^c_{\{[\![p_2]\!]\}} \circ^c flatten\,(\chi_{\langle \mathrm{In}+\mathrm{Env}\rangle}([\![p_1]\!]))\Bigr)$$

Translation from CAMP to $\mathrm{NRA}^c$     $\boxed{[\![p]\!]_r = q}$

Fig. 8

$$\frac{}{NRA(d)} \quad \frac{}{NRA(\text{In})} \quad \frac{NRA(q_1) \quad NRA(q_2)}{NRA(q_2 \circ q_1)}$$

$$\frac{NRA(q)}{NRA(\ominus q)} \quad \frac{NRA(q_1) \quad NRA(q_2)}{NRA(q_1 \otimes q_2)}$$

$$\frac{NRA(q_1) \quad NRA(q_2)}{NRA(\chi_{(q_2)}(q_1))} \quad \frac{NRA(q_1) \quad NRA(q_2)}{NRA(\sigma_{(q_2)}(q_1))}$$

$$\frac{NRA(q_1) \quad NRA(q_2)}{NRA(q_1 \times q_2)} \quad \frac{NRA(q_1) \quad NRA(q_2)}{NRA(\bowtie^d_{(q_2)}(q_1))}$$

$$\frac{NRA(q_1) \quad NRA(q_2)}{NRA(q_1 \| q_2)} \quad \frac{NRA(q)}{NRA((A) \, q)}$$

NRA subset of $NRA^\epsilon$     $\boxed{NRA(q)}$     Fig. 10

$$\frac{}{\mathcal{I}^i(d)} \quad \frac{\mathcal{I}^i(q_1)}{\mathcal{I}^i(q_2 \circ q_1)}$$

$$\frac{\mathcal{I}^i(q)}{\mathcal{I}^i(\ominus q)} \quad \frac{\mathcal{I}^i(q_1) \quad \mathcal{I}^i(q_2)}{\mathcal{I}^i(q_1 \otimes q_2)} \quad \frac{\mathcal{I}^i(q_1)}{\mathcal{I}^i(\chi_{(q_2)}(q_1))}$$

$$\frac{\mathcal{I}^i(q_1)}{\mathcal{I}^i(\sigma_{(q_2)}(q_1))} \quad \frac{\mathcal{I}^i(q_1) \quad \mathcal{I}^i(q_2)}{\mathcal{I}^i(q_1 \times q_2)} \quad \frac{\mathcal{I}^i(q_1)}{\mathcal{I}^i(\bowtie^d_{(q_2)}(q_1))}$$

$$\frac{\mathcal{I}^i(q_1) \quad \mathcal{I}^i(q_2)}{\mathcal{I}^i(q_1 \| q_2)} \quad \frac{\mathcal{I}^i(q)}{\mathcal{I}^i((A) \, q)}$$

$$\frac{}{\mathcal{I}^i(\text{Env})} \quad \frac{\mathcal{I}^i(q_1) \quad \mathcal{I}^i(q_2)}{\mathcal{I}^i(q_2 \circ^\epsilon q_1)} \quad \frac{\mathcal{I}^i(q_1)}{\mathcal{I}^i(\chi^\epsilon_{q_1})}$$

$NRA^\epsilon$ that ignore In     $\boxed{\mathcal{I}^i(q)}$     Fig. 11

$$\frac{}{\mathcal{I}^e(d)} \quad \frac{}{\mathcal{I}^e(\text{In})} \quad \frac{\mathcal{I}^e(q_1) \quad \mathcal{I}^e(q_2)}{\mathcal{I}^e(q_2 \circ q_1)}$$

$$\frac{\mathcal{I}^e(q)}{\mathcal{I}^e(\ominus q)} \quad \frac{\mathcal{I}^e(q_1) \quad \mathcal{I}^e(q_2)}{\mathcal{I}^e(q_1 \otimes q_2)} \quad \frac{\mathcal{I}^e(q_1) \quad \mathcal{I}^e(q_2)}{\mathcal{I}^e(\chi_{(q_2)}(q_1))}$$

$$\frac{\mathcal{I}^e(q_1) \quad \mathcal{I}^e(q_2)}{\mathcal{I}^e(\pi_{(q_2)}(q_1))} \quad \frac{\mathcal{I}^e(q_1) \quad \mathcal{I}^e(q_2)}{\mathcal{I}^e(q_1 \times q_2)} \quad \frac{\mathcal{I}^e(q_1) \quad \mathcal{I}^e(q_2)}{\mathcal{I}^e(\bowtie_{(q_2)}(q_1))}$$

$$\frac{\mathcal{I}^e(q_1) \quad \mathcal{I}^e(q_2)}{\mathcal{I}^e(q_1|q_2)} \quad \frac{\mathcal{I}^e(q)}{\mathcal{I}^e((A) \, q)} \quad \frac{\mathcal{I}^e(q_2)}{\mathcal{I}^e(q_2 \circ^e q_1)}$$

$$\text{NRA}^e \text{ that ignore Env} \quad \boxed{\mathcal{I}^e(q)}$$

Fig. 12

$$\frac{}{\delta \vdash d_0 @ d \Downarrow_n d_0} \text{(Constant)} \quad \frac{}{\delta \vdash \text{In} @ d \Downarrow_n d} \text{(ID)} \quad \frac{\delta \vdash q @ d \Downarrow_n d_0 \quad \ominus d_0 = d_1}{\delta \vdash \ominus q @ d \Downarrow_n d_1} \text{(Unary Operator)}$$

$$\frac{\delta \vdash q_1 @ d \Downarrow_n d_1 \quad \delta \vdash q_2 @ d \Downarrow_n d_2 \quad d_1 \otimes d_2 = d_3}{\delta \vdash q_1 \otimes q_2 @ d \Downarrow_n d_3} \text{(Binary Operator)} \quad \frac{\delta \vdash q_1 @ d \Downarrow_n \emptyset}{\delta \vdash \chi_{(q_2)}(q_1) @ d \Downarrow_n \emptyset} \text{(Map } \emptyset\text{)}$$

$$\frac{\delta \vdash q_1 @ d \Downarrow_n \{d_1\} \cup s_1 \quad \delta \vdash q_2 @ d_1 \Downarrow_n d_2 \quad \delta \vdash \chi_{(q_2)}(s_1) @ d \Downarrow_n s_2}{\delta \vdash \chi_{(q_2)}(q_1) @ d \Downarrow_n \{d_2\} \cup s_2} \text{(Map)}$$

$$\frac{\delta \vdash q_1 @ d \Downarrow_n \{d_1\} \cup s_1 \quad \delta \vdash q_2 @ d_1 \Downarrow_n \text{true} \quad \sigma_{(q_2)}(s_1) @ d \Downarrow_n s_2}{\delta \vdash \sigma_{(q_2)}(q_1) @ d \Downarrow_n \{d_1\} \cup s_2} \text{(Select True)}$$

$$\frac{\delta \vdash q_1 @ d \Downarrow_n \{d_1\} \cup s_1 \quad \delta \vdash q_2 @ d_1 \Downarrow_n \text{false} \quad \delta \vdash \sigma_{(q_2)}(s_1) @ d \Downarrow_n s_2}{\delta \vdash \sigma_{(q_2)}(q_1) @ d \Downarrow_n s_2} \text{(Select False)}$$

$$\frac{\delta \vdash q_1 @ d \Downarrow_n \emptyset}{\delta \vdash \sigma_{(q_2)}(q_1) @ d \Downarrow_n \emptyset} \text{(Select } \emptyset\text{)} \quad \frac{\delta \vdash q_1 @ d \Downarrow_n \emptyset}{\delta \vdash q_1 \times q_2 @ d \Downarrow_n \emptyset} \text{(Product } \emptyset_1\text{)} \quad \frac{\delta \vdash q_2 @ d \Downarrow_n \emptyset}{\delta \vdash q_1 \times q_2 @ d \Downarrow_n \emptyset} \text{(Product } \emptyset_2\text{)}$$

$$\frac{\delta \vdash q_1 @ d \Downarrow_n \{d_1\} \cup s_1 \quad \delta \vdash q_2 @ d \Downarrow_n \{d_2\} \cup s_2 \quad \delta \vdash \{d_1\} \times s_2 @ d \Downarrow_n s_3 \quad \delta \vdash s_1 \times (\{d_2\} \cup s_2) @ d \Downarrow_n s_4}{\delta \vdash q_1 \times q_2 @ d \Downarrow_n \{d_1 * d_2\} \cup s_3 \cup s_4} \text{(Prod)}$$

$$\frac{\delta \vdash q_1 @ d \Downarrow_n \{d_1\} \cup s_1 \quad \delta \vdash q_2 @ d_1 \Downarrow_n \{d_2\} \cup s_2 \quad \delta \vdash \bowtie^d_{(q_2)}(\{d_1\}) @ d \Downarrow_n s_3 \quad \delta \vdash \bowtie^d_{(q_2)}(s_1) @ d \Downarrow_n s_4}{\delta \vdash \bowtie^d_{(q_2)}(q_1) @ d \Downarrow_n \{d_1 * d_2\} \cup s_3 \cup s_4} \text{(DJ)}$$

$$\frac{\delta \vdash q_1 @ d \Downarrow_n \emptyset}{\delta \vdash \bowtie^d_{(q_2)}(q_1) @ d \Downarrow_n \emptyset} \text{(DJ } \emptyset_1\text{)} \quad \frac{\delta \vdash q_1 @ d \Downarrow_n \{d_1\} \cup s_1 \quad \delta \vdash q_2 @ d_1 \Downarrow_n \emptyset \quad \delta \vdash \bowtie^d_{(q_2)}(s_1) @ d \Downarrow_n s_2}{\delta \vdash \bowtie^d_{(q_2)}(q_1) @ d \Downarrow_n s_2} \text{(DJ } \emptyset_2\text{)}$$

$$\frac{\delta \vdash q_1 @ d \Downarrow_n d_1 \quad \delta \vdash d_1 \neq \emptyset}{\delta \vdash q_1 \mid q_2 @ d \Downarrow_n d_1} \text{(Default } \neg \text{Null)} \quad \frac{\delta \vdash q_1 @ d \Downarrow_n \emptyset \quad \delta \vdash q_2 @ d \Downarrow_n d_2}{\delta \vdash q_1 \mid q_2 @ d \Downarrow_n d_2} \text{(Default Null)}$$

$$\frac{\delta \vdash q @ d_0 \Downarrow_n \text{brand } A'(d) \quad \delta(A', A)}{\delta \vdash (A) \, q @ d_0 \Downarrow_n \{\text{brand } A(d)\}} \text{(Cast)} \quad \frac{\delta \vdash q @ d_0 \Downarrow_n \text{brand } A'(d) \quad \neg \delta(A', A)}{\delta \vdash (A) \, q @ d_0 \Downarrow_n \{\}} \text{(CastFail)}$$

NRA Semantics. $\boxed{\delta \vdash q @ d \Downarrow_n d}$

Fig. 13

$$\frac{\sigma(x) = d}{\sigma \vdash x \Downarrow_c d} \text{(Variable)} \qquad \frac{}{\sigma \vdash d \Downarrow_c d} \text{(Constant)} \qquad \frac{\sigma \vdash e \Downarrow_c d_2 \quad \oplus d_2 = d_1}{\sigma \vdash \oplus e \Downarrow_c d_1} \text{(Unary Operator)}$$

$$\frac{\sigma \vdash e_1 \Downarrow_c d_1 \quad \sigma \vdash e_2 \Downarrow_c d_2 \quad d_1 \otimes d_2 = d_3}{\sigma \vdash e_1 \otimes e_2 \Downarrow_c d_3} \text{(Binary Operator)}$$

$$\frac{\sigma \vdash e_1 \Downarrow_c d_1 \quad (x : d_1, \sigma) \vdash e_2 \Downarrow_c d_2}{\sigma \vdash \text{let } x = e_1 \text{ in } e_2 \Downarrow_c d_2} \text{(Let)} \qquad \frac{\sigma \vdash e_1 \Downarrow_c \emptyset}{\sigma \vdash \{e_2 \mid x \in e_1\} \Downarrow_c \emptyset} \text{(For } \emptyset\text{)}$$

$$\frac{\sigma \vdash e_1 \Downarrow_c \{d\} \cup s \quad (x : d, \sigma) \vdash e_2 \Downarrow_c d_3 \quad \sigma \vdash \{e_2 \mid x \in s\} \Downarrow_c s_0}{\sigma \vdash \{e_2 \mid x \in e_1\} \Downarrow_c \{d_3\} \cup s_0} \text{(For)}$$

$$\frac{\sigma \vdash e_1 \Downarrow_c \text{true} \quad \sigma \vdash e_2 \Downarrow_c d_2}{\sigma \vdash e_1 ? e_2 : e_3 \Downarrow_c d_2} \text{(If True)} \qquad \frac{\sigma \vdash e_1 \Downarrow_c \text{false} \quad \sigma \vdash e_3 \Downarrow_c d_3}{\sigma \vdash e_1 ? e_2 : e_3 \Downarrow_c d_3} \text{(If False)}$$

NNRC Semantics. $\boxed{\sigma \vdash e \Downarrow_c d}$

Fig. 14

$$[\![d]\!]_{x_j,x_e} = d$$
$$[\![\text{In}]\!]_{x_j,x_e} = x_j$$
$$[\![\ominus q]\!]_{x_j,x_e} = \ominus [\![q]\!]_{x_j,x_e}$$
$$[\![q_1 \otimes q_2]\!]_{x_j,x_e} = [\![q_1]\!]_{x_j,x_e} \otimes [\![q_2]\!]_{x_j,x_e}$$
$$[\![q_2 \circ q_1]\!]_{x_j,x_e} = \text{let } x = [\![q_1]\!]_{x_j,x_e} \text{ in } [\![q_2]\!]_{x,x_e} \qquad x \text{ is fresh}$$
$$[\![\chi_{\langle q_2 \rangle}(q_1)]\!]_{x_j,x_e} = \{[\![q_2]\!]_{x,x_e} \mid x \in [\![q_1]\!]_{x_j,x_e}\} \qquad x \text{ is fresh}$$
$$[\![\sigma_{\langle q_2 \rangle}(q_1)]\!]_{x_j,x_e} = \text{flatten}(\{[\![q_2]\!]_{x,x_e} ? \{x\} : \emptyset \mid x \in [\![q_1]\!]_{x_j,x_e}\}) \qquad x \text{ is fresh}$$
$$[\![q_1 \times q_2]\!]_{x_j,x_e} = \text{flatten}(\{\{x_1 * x_2 \mid x_2 \in [\![q_2]\!]_{x_j,x_e}\} \mid x_1 \in [\![q_1]\!]_{x_j,x_e}\}) \qquad x_1 \text{ is fresh} \wedge x_2 \text{ is fresh}$$
$$[\![\bowtie^d_{\langle q_2 \rangle}(q_1)]\!]_{x_j,x_e} = \text{flatten}(\{\{x_1 * x_2 \mid x_2 \in [\![q_2]\!]_{x_1,x_e}\} \mid x_1 \in [\![q_1]\!]_{x_j,x_e}\}) \qquad x_1 \text{ is fresh} \wedge x_2 \text{ is fresh}$$
$$[\![q_1 \parallel q_2]\!]_{x_j,x_e} = \text{let } x = [\![q_1]\!]_{x_j,x_e} \text{ in } ((x = \emptyset) ? [\![q_2]\!]_{x_j,x_e} : x) \qquad x \text{ is fresh}$$
$$[\![\text{Env}]\!]_{x_j,x_e} = x_e$$
$$[\![q_2 \circ^e q_1]\!]_{x_j,x_e} = \text{let } x = [\![q_1]\!]_{x_j,x_e} \text{ in } [\![q_2]\!]_{x_j,x} \qquad x \text{ is fresh}$$
$$[\![\chi^e_{\langle q_2 \rangle}]\!]_{x_j,x_e} = \{[\![q_2]\!]_{x_j,x} \mid x \in x_e\} \qquad x \text{ is fresh}$$

NRA$^e$ semantics using NNRC. $\boxed{[\![q]\!]_{x_j,x_e} = e}$

Fig. 15

DATABASE ALGEBRA AND COMPILER WITH ENVIRONMENTS

BACKGROUND

The present application relates generally to computers and computer applications, and more particularly to database compilers and environment manipulation.

While the global environment for the Structured Query Language (SQL) may include names of top-level tables, more modern data processing languages such as Object Query Language (OQL), Jaql (a query language designed for the JavaScript Object Notation—JSON), Apache Pig (platform for analyzing large data sets), SPARQL (a query language for the Resource Description Framework—RDF), JRules (a language for business rule management), LINQ (Language-Integrated Query), Links, feature non-trivial and changing environments. Handling those environments when using traditional database compilation approaches may result in complex query plans that are difficult to optimize and execute efficiently.

Known solutions to more modern data processing languages either avoid relational technology, for instance, bypass relational database algebra by using alternative approaches that may only be applicable to specific scenarios, or limit using complex nesting in the syntax to facilitate optimization. Other approaches represent environments as database records, and require unnecessarily complex query optimization (e.g., unnesting).

BRIEF SUMMARY

A database compiler system and method with environment support may be provided. In one aspect, a computer-implemented method of developing a database compiler with environment support may include extending database operators in a database compiler for native environment support to include environment as an input parameter in addition to input data. The method may also include adding to the database compiler, environment operators that perform one or more of accessing and modifying the environment, wherein the database compiler compiles a query language into a database algebra supporting the environment.

A method of compiling a query language by a database compiler with environment support, in one aspect, may include receiving a query language by one or more computer processors. The method may also include compiling the query language into a database algebra with environment support. The method may further include rewriting the database algebra with environment support to optimize the database algebra. The method may also include generating a backend code from the database algebra that is optimized, wherein the backend code is operable to run on a database runtime having no environment support.

A database compiler system, in one aspect, may include one or more hardware processors. A database compiler may be operable to execute on one or more of the hardware processors. The database compiler may include operators extended to include environment as an input parameter. The database compiler may further include environment operators that perform one or more of accessing and modifying the environment. The database compiler may be operable to receive a query language. The database compiler may be further operable to compile the query language into a database algebra with environment support. The database compiler may be further operable to rewrite the database algebra with environment support to optimize the database algebra. The database compiler may be further operable to generate a backend code from the database algebra that is optimized, wherein the backend code is operable to run on a database runtime having no environment support.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 shows example of a query, its compilation and optimization with environment support in one embodiment of the present disclosure.

FIG. 3 is a diagram showing example database algebra with environment extensions in one embodiment of the present disclosure.

FIG. 5 provides a big-step operational semantics for business rules languages calculus (CAMP) in one embodiment of the present disclosure.

FIG. 6 shows an operational semantics for nested relational algebra with environment ($NRA^e$) in one embodiment of the present disclosure.

FIG. 7 shows a direct translation from $NRA^e$ to nested relational algebra (NRA), given an environment which is a mapping from a finite set of variables to values, in one embodiment of the present disclosure.

FIG. 8 presents a translation from CAMP to $NRA^e$ instead of NRA in one embodiment of the present disclosure.

FIG. 10 presents a NRA(q) condition, which holds for queries q which do not use any of the environment operators in one embodiment of the present disclosure.

FIG. 11 presents a $I^i(q)$ condition, which holds for queries q which do not access the input data (In) in one embodiment of the present disclosure.

FIG. 12 presents a $I^e(q)$ condition, which holds for queries q which do not access the input environment (Env) in one embodiment of the present disclosure.

FIG. 13 presents an operational semantics for NRA in one embodiment of the present disclosure.

FIG. 14 provides denotational semantics given to the named nested relational calculus (NNRC), given an environment which is a mapping from a finite set of variables to values, in one embodiment of the present disclosure.

FIG. 15 shows a full translation from $NRA^e$ to NNRC in one embodiment of the present disclosure.

DETAILED DESCRIPTION

A method, system and technique are disclosed that augment the database algebra with operators for native environment support. In one embodiment, the methodology of the present disclosure augments a database compiler and optimizer to handle those operators. Providing native support for environments may avoid an initial query plan building up to an unmanageable size. A technique in one embodiment of the present disclosure may extend an existing database compiler and optimizer with minimal intrusion. In one aspect, a design of the environment operators in one embodiment of the present disclosure allows for reusing existing database optimizations with no change. In another aspect, environment manipulation can be simplified or eliminated, using rewrites. Keeping environment manipulation explicit facilitates code generation in some applications.

In one embodiment, a method of the present disclosure may handle environments in database compilers and optimizers effectively, for instance, by providing database operators that take an environment as part of the input. For example, existing database operators, which take one input data (In), may be extended to take one input data (In) plus an environment (Env). Environment refers to variable bindings and global parameters of a computer environment. New database operators may be provided to access or modify the environment. New rewrites to optimize operations over the environment may be added to the database compiler and/or optimizer. In one embodiment, a database compiler may be built that support environment using nested relational database algebra. For example, environment operators may be added to the nested relational algebra (NRA) to access or modify the environment.

The method may support existing database optimizations from relational and nested-relational context. Resulting query plans may be executed with environment operators in a system which does not support environment. The method may also provide support for an application of the database and compiler with environment for the compilation of business rules.

Figure 1:
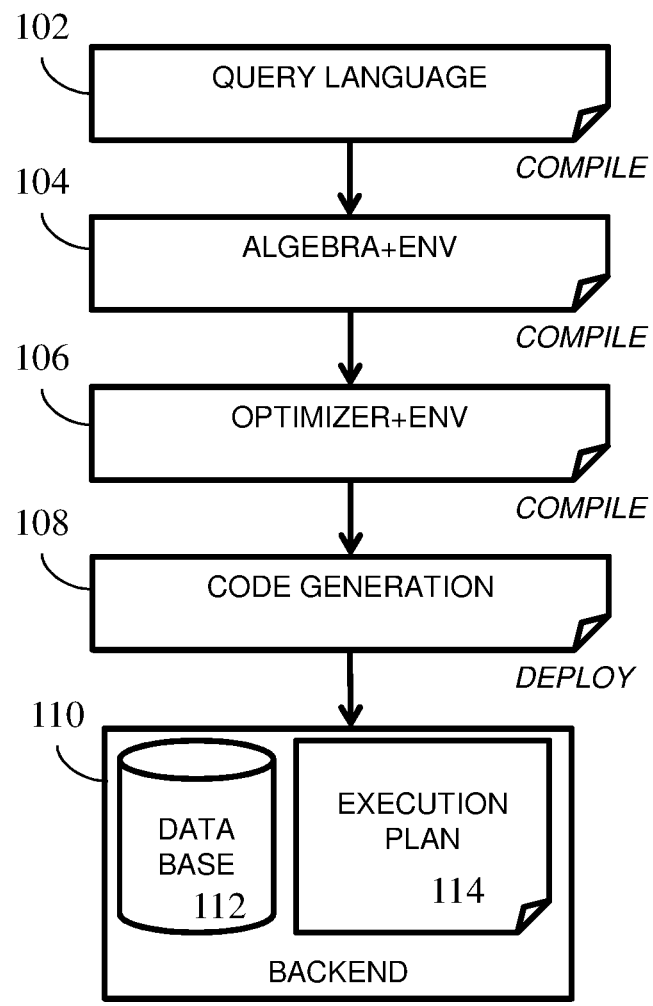
FIG. 1 is a diagram illustrating an overview of a query compiler with environment support in one embodiment of the present disclosure.

FIG. 1 is a diagram illustrating an overview of a query compiler with environment support in one embodiment of the present disclosure. A computer executable application may be written in a query language shown at 102. Examples of the query language may include, but are not limited to, OQL, JRule, XQuery (language for querying the extensible markup language—XML), SPARQL. At 102, a query language may be received and compiled into database algebra with environment operators shown at 104, such as the relational or nested-relational algebra with environment operators. For instance, query languages that include declarative, nested statements and complex environment manipulations may be compiled into an algebraic query with environment support. The compilation maps environment manipulation in the query to environment operations in the database algebra.

A compiler of the present disclosure in one embodiment may perform rewrites and optimizations, pipelined evaluation and provide environment support. The algebra with environment operators is further optimized by a query optimizer and rewrites for environment operators as shown at 106. The optimizer generated query and rewrites for environment operators are compiled to generate a program code as shown at 108. The code is generated into a backend specific executable, for example, and may remove environment data, mapping back to nested relational algebra. The code 108 may be deployed for execution as an execution plan or executable 114, to a computer system, for example, a backend computer system 110, which may be coupled to a database system 112 storing data for queries. Examples of the database backend may include but are not limited to relational database (e.g., DB2 from International Business Corporation (IBM)®, Armonk, N.Y.), map/reduce (e.g., Hadoop) or distributed data processors (e.g., Spark). A methodology of the present disclosure in one embodiment, which for example, can be integrated with existing or legacy query compilers, may simplify compilation and optimization for query languages with nesting and environments in products and applications (e.g., XQuery or SPARQL in DB2, aggregates in Operational Decision Manager (ODM) Insights from IBM®).

FIG. 2 shows an example of a query, which is then compiled and optimized with environment support in one embodiment of the present disclosure. A query, for example, written using JRule at 202, when compiled into the nested relational algebra may result in complex nesting as shown at 204. Compiled with environment support using a compiler in one embodiment of the present disclosure, for instance, as shown in FIG. 1, can produce the nested relational algebra with environment support shown at 206. The compiled version at 206 uses an environment operator, which can be more easily optimized. The result shown at 208 is much more efficient and can be produced by an optimization, e.g., performed at 106 in FIG. 1.

FIG. 3 is a diagram showing example database algebra with environment extensions in one embodiment of the present disclosure. Relational algebra operations that are executed on a computer (e.g., hardware processor) may include but are not limited to union, intersection, difference, selection, projection (map), joins and products. A query may be transformed to a query plan (a machine executable query plan) using algebraic transformation supported by the database algebra operators. The operators shown at 302 illustrate examples of the environment operators added to a database compiler in one embodiment of the present disclosure. Those operators extend nested relational algebra and enable new optimizations. Each operator may take two inputs: input data and input environment.

An embodiment of the present disclosure provides a database compiler with environment support, for example, database compiler for nested query languages with environment support. Database compiler may be developed with environment support using nested relational algebra (NRA), for example, by adding environment operators to NRA and adding environment operator rewrites to a query optimizer. The compiler allows for using database runtime without environment as backend of database compiler with environment support by compiling the NRA extended with environment back to the original NRA, as illustrated on FIG. 7.

Rules language are an example of a source language to which the compiler of the present disclosure in one embodiment may apply. Rules can encode complex data-centric policies in a flexible manner, rules are popular in business applications. To better handle complex and large-scale data, modern rules languages include support for nested objects, pattern matching capabilities, and aggregation. Delegating part of the rules processing to a database runtime provides for scalability, but naive translation to a database language yields large and deeply nested plans which are challenging for standard database optimizers. An approach is developed in the present disclosure for the effective compilation and execution of query languages, for instance, modern business rules languages as an example, using database technology. The approach implements an extension of the nested relational algebra (NRA) with native support for environment manipulation that allows the reuse of standard NRA rewrites. For example, based on this approach, an end-to-end compiler from a query language (e.g., business rules language) to a cloud database runtime may be provided.

Production rules are popular for business intelligence applications as they can encode complex data-centric policies in a flexible manner. Rules often appeal to business users because they are easy to understand, extend, and modify. Modern variants of production rules include JRules and Drools, which add support for nested data and objects, advanced pattern matching features, and aggregation. Existing business rules engines are usually centralized, tied to their internal data representation, and optimized for scalability in the number of rules rather than data size. A methodology in the present disclosure in one embodiment may work as part of a system in which the data-intensive part of those rules can be delegated to a database runtime for scalability.

The following shows an example of a business rule with aggregation, written in JRules using the condition-action structure common to many rules languages:

```
1  rule FindMarketers {
2    when {
3      C: Client( );
4      Ms: aggregate {
5        M: Marketer(clients.contains(C.id));
6      } do { ArrayList<String> { M.name }; }
7    } then { insert new C2Ms(C, Ms); }
8  }
```

The condition (when, Lines 2-6) binds variable C to input objects that match the Client( ) class, then aggregates all input objects that match the Marketer( ) class (in variable M) for whom C belongs to M's collection of clients. A collection type (ArrayList) is used to collect the marketers' names and then bound to variable Ms. The action (then, Line 7) creates a new object that materializes the mapping from C to Ms. This mapping could then be consulted in other rules, for instance: when a crucial client event happens, then notify all responsible marketers.

In order to scale to large collections of objects, the compilation and optimization of as much of those rules as possible may be delegated to a database runtime. The methodology of the present disclosure in one embodiment of the present disclosure addresses the additional challenge of starting from an existing, and expressive, language, for example, rules language. Rather than building an extension for rules directly inside the database, the methodology of the present disclosure in one embodiment may identify the "query fragment" in existing rules, carve an alternative compilation path to a database language for optimization and execution, and send the result back for further processing by the rules engine. In the above sample JRule, most of the rule can be handed over to the database since it performs a regrouping. The methodology of the present disclosure in one embodiment may address: (i) how to accurately capture the rules data model and type system on the database side, (ii) how to identify the subset of the rules language that should be delegated to the database, (iii) how to guarantee that the original rules semantics are preserved during compilation, and (iv) how to make sure the resulting queries can be optimized effectively.

To handle the rules data model and type system, a methodology in one embodiment of the present disclosure may encode objects that belong to the rule's business object model as nested relational structures similarly to an object-oriented database management system (OODBMS). To identify the querying part of the rules, the methodology of the present disclosure in one embodiment may start from a calculus for pattern matching and aggregation (CAMP) that captures the rules semantics. That calculus has the same expressiveness as the nested relational algebra (NRA) and named-nested relational calculus (NNRC), while capturing the following aspects of rules' semantics: Rules perform pattern matching against an input datum in the context of an environment containing variable bindings, where either can change as pattern matching proceeds; Match failure in rules is recoverable and propagated during evaluation. Those aspects can be captured in a database algebra as follows: (i) the rules context (input datum and environment) can be reified as a record that is the input of the algebraic plan, and (ii) the result of pattern matching can be encoded as a singleton bag for match success, or as an empty bag for match failure, that is the output of the algebraic plan. The methodology of the present disclosure in one embodiment makes this approach practical while preserving semantic correctness, for example, by delaying the reification of the rules environments by targeting an extension of the NRA with a built-in notion of environment. That approach in one embodiment reduces the size of the initial plan and facilitates reasoning and optimization. The corresponding NRA extension, and its use in a compiler, for example, for business rules as an example is provided below.

$NRA^e$, an extension of the nested-relational algebra with environments, defined in the present disclosure in one embodiment has the same expressiveness as the standard NRA. In one aspect, all existing algebraic equivalences for NRA can be lifted $NRA^e$. $NRA^e$ may be applied to the compilation of a query language, for example, business rules. The present disclosure in one embodiment also develops a translation from rules to $NRA^e$, and defines algebraic equivalences suitable for optimization of the resulting plans. An end-to-end compiler from an existing business rules language for execution on cloud-based data runtimes is presented as an example.

Figure 4:
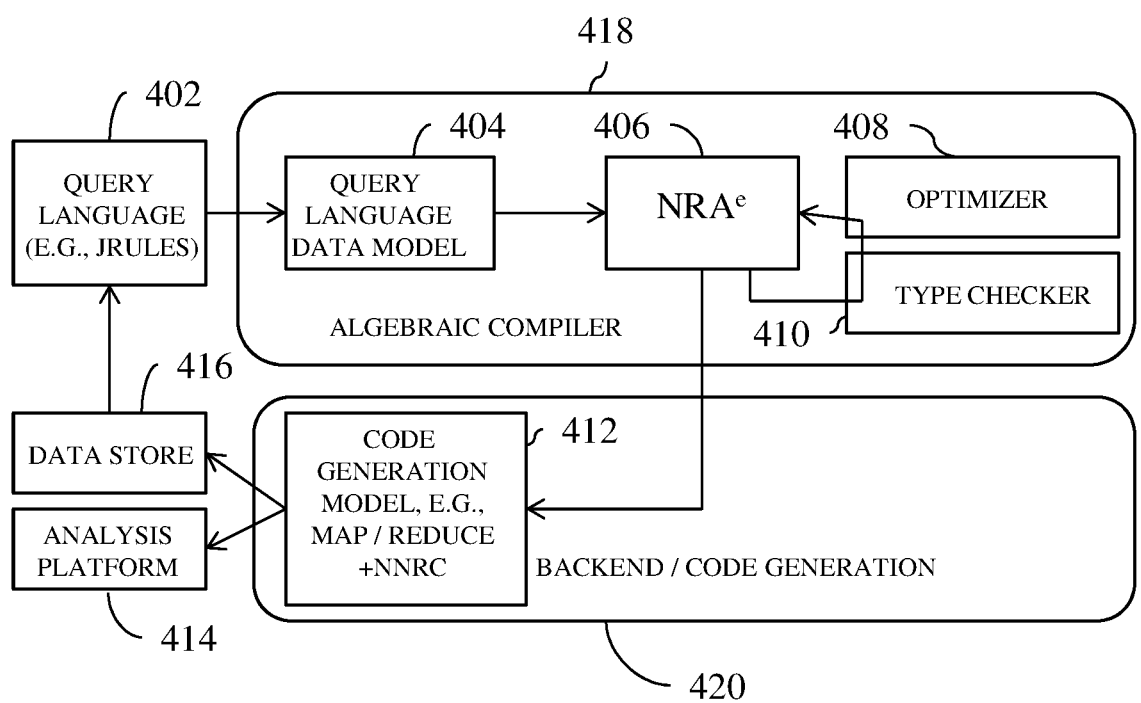
FIG. 4 shows an overview of compiler architecture in one embodiment of the present disclosure.

FIG. 4 shows an overview of database compiler architecture in one embodiment of the present disclosure. An example query language 402 that the compiler of the present disclosure may handle may include JRules. Components of the compiler 418 and the backend/code generation component 420 may run or execute on one or more hardware processors. The following description uses JRules as an example query language that is processed. However, it should be understood that the methodology of the present disclosure may apply to other query languages. Code generated from the query language 402 according to one embodiment of a methodology in the present disclosure may be run or executed on a computer, for example, as a cloud runtime on an analysis platform 414 querying a data or document store 416, e.g., that is stored as part of a cloud environment.

In one embodiment, the processing is performed independent of the specific backend. Rules (or queries in another query language) may be processed through intermediate representations: a data model 404 that captures the rules (or query) semantics, extended nested relational algebra ($NRA^e$) 406 and an optimizer 408 for optimization, and a code generation model 412 to facilitate code generation, e.g., to map/reduce, which for example, uses map and reduce whose operations are described using the named nested relational calculus.

As an example, an algebraic compiler 418 of the present disclosure in one embodiment may be implemented or written using proof assistant tools like Coq, for instance, to ensure semantic correctness. Such system may allow for specifying and verifying correctness properties. The implementation may include proofs of semantics and type preservation, and of the correctness of the algebraic optimizations, all of which may be mechanically checked. The compiler may include a type checker 410 that supports type checking and also support rules or query language advanced features such as inheritance and object references.

The following description illustrates a compilation methodology of the present disclosure in one embodiment. The description uses a simple rule, a JRule example, for the sake of explanation only shown as Example 1 below.

Example 1

```
rule ABChq {
  when {
    C: Client (name == "ABC");
  } then {
    println("ABC's HQs are in " + C.hq);
  }
}
```

TABLE 1

| brand | value | | | |
|---|---|---|---|---|
| | Id | name | hq | ticker |
| Client | 1 | XXX | Loc_X | XX |
| | 2 | ABC | Loc_A | AB |
| | 3 | YYY | Loc_Y | YY |
| | 4 | ZZZ | Loc_Z | ZZ |
| | Id | name | client | hired |
| Marketer | 1 | A | {1, 4} | 2015 |
| | 2 | B | {2} | 2007 |
| | 3 | C | {4, 2} | 2009 |

The example returns ABC's headquarters, which is run over a sample input data, a collection of object shown in Table 1. A nested-relational representation may be used for the input data, where objects are tagged with a brand that indicates their class (e.g., Client or Marketer) in a way similar to how objects are handled in an object oriented database management systems. The value of each object is a record with the attributes for that object. In this example, each of those includes an identifier (id) attribute of type integer and a name attribute of type string. Clients have also an attribute hq indicating their headquarters and a stock ticker, both of type string. Marketers have also an attribute, clients, whose type is a collection of client ids, and a hired attribute of type integer.

Capturing Rules Semantics

The example query, here the rule, is translated in a form suitable for further processing. In one embodiment, a pattern calculus for rule languages (e.g., Calculus for Aggregating Matching Patterns—CAMP) may be used for translating the example rule. The translation directly reflects the syntactic structure of the rule and is as follows.

```
when    cast Client
  ^     (!it).name = "ABC"
  ^     let env += [C : it] in env;
return       "ABC's HQs are in" + !(env.C).hq
```

Each clause in the 'when' part of the input rule corresponds to a when pattern in CAMP, while the action part is translated into a return pattern. The calculus captures only the querying part of the rule, not the side effects from the rule's action, and here simply returns a string. The rule's data flow is made explicit in the calculus, using "it" to denote the context datum and 'env' to denote the environment. The context datum can be changed using the 'let it= . . . in . . . ' pattern. The environment can be extended using the 'let env+= . . . in . . . ' pattern, which adds a variable and performs unification if necessary, i.e., if an environment is extended with a variable already in scope it succeeds if and only if the variable is bound to the same value and it returns a match failure otherwise.

Focusing on the when clause, the first pattern 'cast Client', matches against the current datum and succeeds if it is an object with the class 'Client' and fails otherwise. The ^ pattern propagates success/failure from its left pattern to its right pattern, which in the above example matches if the context datum has an attribute name whose value is "ABC". The operator '!' returns the value of the corresponding object. The subsequent pattern extends the environment with variable C bound to the context datum. The when construct applies its pattern to every object in the input collection of data, returning variable bindings for each match success, also referred to as instantiations. All successful bindings are passed to the return, which constructs a string by: looking up variable C in the environment, then applying string concatenation to the value of the hq attribute in that 'Client' object.

In the example, context manipulation and match failure propagation are fundamental to the rules semantics. Both aspects can be captured in the relational algebra by using records to encode the context and bags to encode match success or failure. The pattern let env+=[C:it] in env from Example 1 binds variable C to the current datum, adds that variable to the environment, and returns the new environment.

The following shows NRA for 'let env+=[C:it] in env' NRA:

flatten($\chi_{\{In.E\}}$ ($\chi_{\{\{F:In.E_2\}^{[D:In.D]}\}}$ ( $\rho_{E_2/\{T_2\}}$($\chi_{\{In^*T_2:In.E+In.E_1\}}$ ( $\rho_{E_1/\{T_1\}}$({In*[T$_1$:$\underline{\chi_{\{C:In\}}}$({In.D})]})))))

The above shows the translation for that pattern in the NRA. The input of that translated pattern in the NRA is always a record with two fields: D for the input datum, and E for the environment which is itself a record containing bindings for in-scope variables. The first part of the translation for [C:it] is underlined and starts by {In.D} which accesses the current value (In.D) then wraps it in a collection to indicate success ({ . . . }). The next step uses a map ($\chi$) operation to construct a singleton bag containing record for variable C ([C:In]).

In turn, the resulting binding is merged with the existing environment. That step, which results from the translation for let env+= . . . in . . . is complex as it first must separate the environment from the input value through unnesting (using the $\rho$ operator), apply the merge (In.E+In.E$_1$), and because it relies on temporary records fields (E$_1$, E$_2$, T$_1$, T$_2$) to store intermediate results. The NRA plan shown above is only the translation for a very small part of an original rule: the full translation which combines many similar query plan fragments contains over 800 operators and has a nesting level of 7.

Translating to NRA$^e$

Instead of trying to develop new query unnesting techniques directly on the NRA translation, the methodology of the present disclosure in one embodiment tackles the problem by first translating to NRA$^e$, which is an extension of the NRA with explicit support for environments. The above translation labeled NRA$^e$ shows the same pattern translated or transformed into NRA$^e$. Instead of a single input, operators in $NRA^e$ have two inputs: In for the input data, and Env for an environment. As a result the translation avoids complex nesting/unnesting operators, leaving only the match failure encoding to deal with. The following shows $NRA^e$ for 'let env+=[C:it] in env'.

$NRA^e$:

flatten($\chi^c_{\{Env\}}$)

$\circ^e$ flatten( $\chi_{\{In+Env\}}$( $\chi_{\{\{C:In\}\}}$({In}))))

The translation to $NRA^e$ uses $\chi_{\{\{C:In\}\}}$({In}) to construct the new variable binding, instead of $\chi_{\{\{C:In\}\}}$({In.D}). Extending the environment is now expressed more simply: the old environment is merged with the new variable binding using In+Env, and the old environment is replaced in the remainder of the query by using the $\circ^e$ operator which changes the environment, followed by $\chi^e$, which applies a map on the environment to account for the fact that the result of the merge is a bag.

Rewritings with Environments

The optimizer shown at 408 may perform rewriting. Switching to $NRA^e$ does not inherently change the nature of the plan or the underlying query execution. However, it distinguishes those two aspects more clearly, allowing the optimizer to tackle them independently. On the rule fragment from the above translation, the resulting expression can be rewritten into {[C:In]*Env} by applying basic equivalences (e.g., a map over a singleton is a singleton that composes both map operands, flatten over a map returning a singleton is the same map with the singleton and flatten removed).

$NRA^e$ after optimization:

{[C:In]*Env}

Query rewriting techniques for $NRA^e$ are provided that are effective to optimize the query plans resulting from the above translation. For example, existing NRA rewritings can be recovered and leveraged on query optimization. As an example, two distinct sets of rewrites are developed. The first set of rewrites tackles error propagation and involves combinations of map, flatten, and other core operations on collections. The second set of rewrites tackles environment manipulation, and involves environment push-downs and projecting out unused variable bindings. The combination of those rewrites are effective for rules tests. For the full running example of Example 1 above, the query plan after optimization is shown below.

Optimized $NRA^e$:

{ $\chi_{\{\pi_{\overline{A_i}}\}}$ ( $\sigma_{\{(In).name="ABC"\}}$ (flatten ($\chi_{\{\{Client\}In\}}$ (Env.WORLD))))}

It first iterates on the input bag corresponding to the input collection and selects objects that are instances of the class Client, then it selects those clients whose name is "ABC", and it applies a map that computes the output string and corresponds to the return in the original rule.

Code Generation

Once the optimized plan has been produced, a code generator (e.g., 412) generates code. An example code generation may target cloud-based data processing infrastructure, e.g., generate map/reduce (M/R) jobs using a representation similar to that used in JAQL. The working memory may be assumed to be stored in a single collection distributed on multiple servers. The compiler 418 proceeds by translating $NRA^e$ into M/R jobs in which both the map and the reduce are written using the named nested relational calculus NNRC. The below code shows the M/R job produced or compiled on the running example of Example 1.

Map/Reduce+NNRC:

```
mapReduce {
    input    := v₀;
    output   := v₁;
    map(doc) := { flatten(
                    { t₁.name = "ABC"
                    ? { "ABC's HQs are in " +t₁.hq }
                    : { } | t₁ ∈ (Client) doc } ) }
    Reduce   := Ø }
```

The below code shows a possible ultimate compilation for a Cloud database for the running example. It includes a map function in JavaScript for a data store or database platform for the cloud. An example of such database platform may include Cloudant from IBM. Here the M/R job has only a simple map and no reduce. The input/output parameters are variables that correspond to the input or output collections.

Map/reduce for database platform built on cloud:

```
function (doc) {
    var t1 = cast("Client", doc);
    var dst1 = [ ];
    for (var src1=flatten(t1), i1=0; i1<src1.length; i1++) {
        var v1 = src1[i1];
        var t2;
        if (equal (unbrand(v1).name, "ABC")) {
            t2 = [(" abc's HQs are in " + toString(unbrand(v1).hq))];
        } else { t2 = [ ]; }
        dst1.push(t2);
    }
    return [flatten(dst1)];
}
```

Data Model

A data model for complex values, operators on that data model, and a formal definition are described with CAMP as an example. Values in the data model, the set D, are atoms, records, bags (multisets) or branded values. There may be a sufficiently large set of atoms a, b, . . . including integers in Z, strings in S, the Boolean values true and false, and a null value written nil. A bag is a multiset of values in D; we write Ø for the empty bag and $\{d_1, \ldots, d_n\}$ for the bag with values $d_1, \ldots, d_n$.

A record is a mapping from a finite set of attributes to values in D, where attribute names are drawn from a sufficiently large set A, B, . . . . We write [ ] for the empty record and $[A_i:d_i]$ for the record mapping $A_i$ to $d_i$. Records x and y are compatible if $\forall A \in dom(x) \cap dom(y), x(A)=y(A)$. We define the sum x+y of compatible records as the union x∪y, and leave it undefined for non-compatible records.

A branded value is a pair of a brand name and a value, where brand names are drawn from a sufficiently large set A, B, . . . . We write brand A (d) for the value d branded with A. We assume a derivation hierarchy, which is a partial order relation δ between brands. We write δ(A, A') to indicate that brand A derives from A'.

Operators

Unary or binary operators are basic operations over the data model and are defined as functions.

Definition 1 (Operators)

(uop)⊕d::=ident d|¬d|{d}|flatten d|[A:d]

|d.A|d−A| $\pi_{\overline{A_i}}$ |brand A (d)|!d (bop) $d_1 \otimes d_2$ ::=$d_1$=$d_2$|$d_1 \in d_2$|$d_1 \cup d_2$

|$d_1*d_2$|$d_1+d_2$

In order of presentation, unary operators are as follow:

ident d returns d.

¬ d negates a Boolean.
{d} constructs a singleton bag containing d.
flatten d flattens a bag of bags.
[A:d] the record with attribute A and value d.
d.A the value of attribute A in record d.
d−A removes attributes A in record d.
$\pi_{\overline{A_i}}$ (d) the projection of record d over $\overline{A_i}$.
brand A (d) a value with brand A containing d.
!d the content of branded value d.
In order of presentation, binary operators are as follow:
$d_1 = d_2$ compares two data for equality.
$d_1 \in d_2$ true if $d_1$ is an element of bag $d_2$.
$d_1 \cup d_2$ the union of two bags.
$d_1 * d_2$ concatenates two records, favoring $d_1$ for overlapping attributes.
$d_1 + d_2$ returns a singleton with the record concatenation if they are compatible, and Ø otherwise.

The above operators are example of operators. The operators can be easily extended (e.g, for arithmetics or aggregation). flatten corresponds to a single-level flattening for nested bags. The given record operations are sufficient to support all the classic relational and nested relational operators.

CAMP

The formal definition for CAMP is described with an extension for branded values. CAMP patterns scrutinize an implicit datum, denoted it, in the context of an environment that maps variables to data, denoted env. Patterns may fail if they do not match the given data. Match failure, denoted err, is not fatal and can trigger alternative pattern matching attempts. Definition 2 shows the syntax for CAMP.

Definition 2 (CAMP Syntax)

Figure 5:
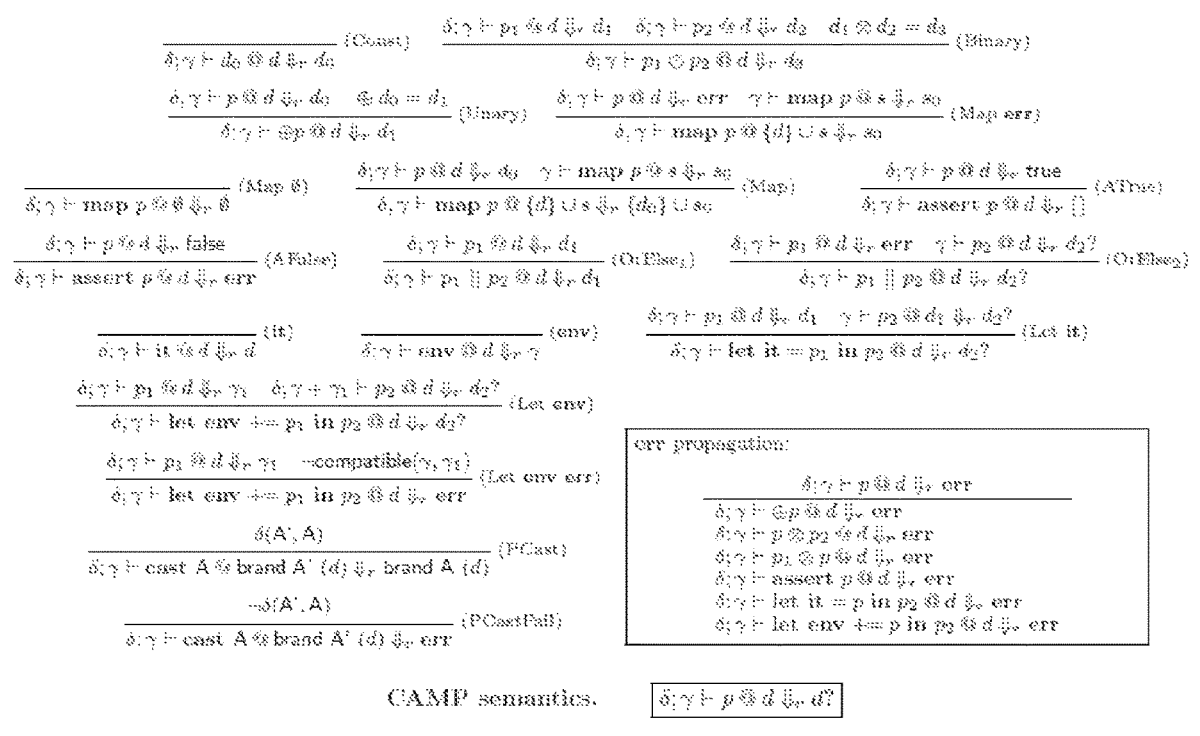

(patterns) p::=d|⊕p|$p_1$ ⊗ $p_2$|map p|assert p
|$p_1$||$p_2$|it|let it=min $p_2$
|env|let env+=$p_1$ in $p_2$|cast A The bottom right FIG. 5 provides a big-step operational semantics in one embodiment of the present disclosure. The relation δ;γ⊢p@d⇓$_r$ d? relates a type derivation δ, an environment γ, a pattern p, and a datum d (the value of implicit datum it) with an output d?. The output is in the lifted data domain D?=D+err, representing either the returned datum or match failure. Technically, the environment γ is a record and variables are the names of the fields of this record. Note that the ⇓$_r$ relation is partial: patterns that are not syntactically correct or given data of the wrong type do not have any derivation. This is distinct from match failure, which is internalized in the relation.

The following goes over each pattern in CAMP. d returns a constant data. Unary (⊕) and binary (⊗) operators can be applied to the result of a pattern or patterns. map p maps a pattern p over the implicit data it. Assuming that it is a bag, the result is the bag of results obtained from matching p against each datum in it, and skipping match failures. assert p allows a pattern p to conditionally cause match failure: if p evaluates to false matching fails, otherwise it returns the empty record [ ]. The $p_1$||$p_2$ construct allows for recovery from match failure: if $p_1$ matches successfully, $p_2$ is ignored; if $p_1$ fails to match, $p_2$ is evaluated. it returns the datum being matched. let it=$p_1$ in $p_2$ binds the implicit datum to the result of a pattern. env reifies the current environment as a record, which can then be manipulated via standard record operators. let env+=$p_1$ in $p_2$ adds new bindings to the environment. The result of matching $p_1$ must be a record, which is interpreted as a reified environment. If the current environment is compatible with the new one (all common attributes have equal values) they are merged and the pattern $p_2$ is evaluated with the merged environment. If they are incompatible, the pattern fails. Merge captures the standard semantics in rules languages that multiple bindings of the same variable must bind to the same value. cast A matches a branded value against brand A, returning a match failure if the brand for the value being matched does not derive from A.

The right bottom part of FIG. 5 includes six rules for err propagation written in compressed form. The antecedent of the given rule separately implies all six of the consequents. Patterns used in Example 1 above are calculus macros, as shown in Rule macros below.

Rule Macros:
$p_1 \wedge p_2$:=let env+=assert $p_1 \wedge p_2$
WW(p):=let it=env.WORLD in p
[[when p;r]]:=flatten (WW (map (let env+=p in [[r]])))
[[return p]]:={p}

For instance, when is defined using WW(p), which applies p to the working memory which is initially stored in variable WORLD, and map p, which iteratively applies a pattern to a collection and skips match failures.

Algebra and Translation

The following description defines $NRA^e$ in one embodiment, the translation from CAMP to $NRA^e$ that provides the initial query plan for the compiler, and states the corresponding correctness results.

$NRA^e$

In one embodiment, NRA is extended with a notion of environment. Existing NRA operators may be utilized, and additionally '||' operator that handles aspects of error propagation in rules, a casting operator to handle branded values, and the operators for environment manipulation.

Definition 3 ($NRA^e$ Syntax).

Figure 6:
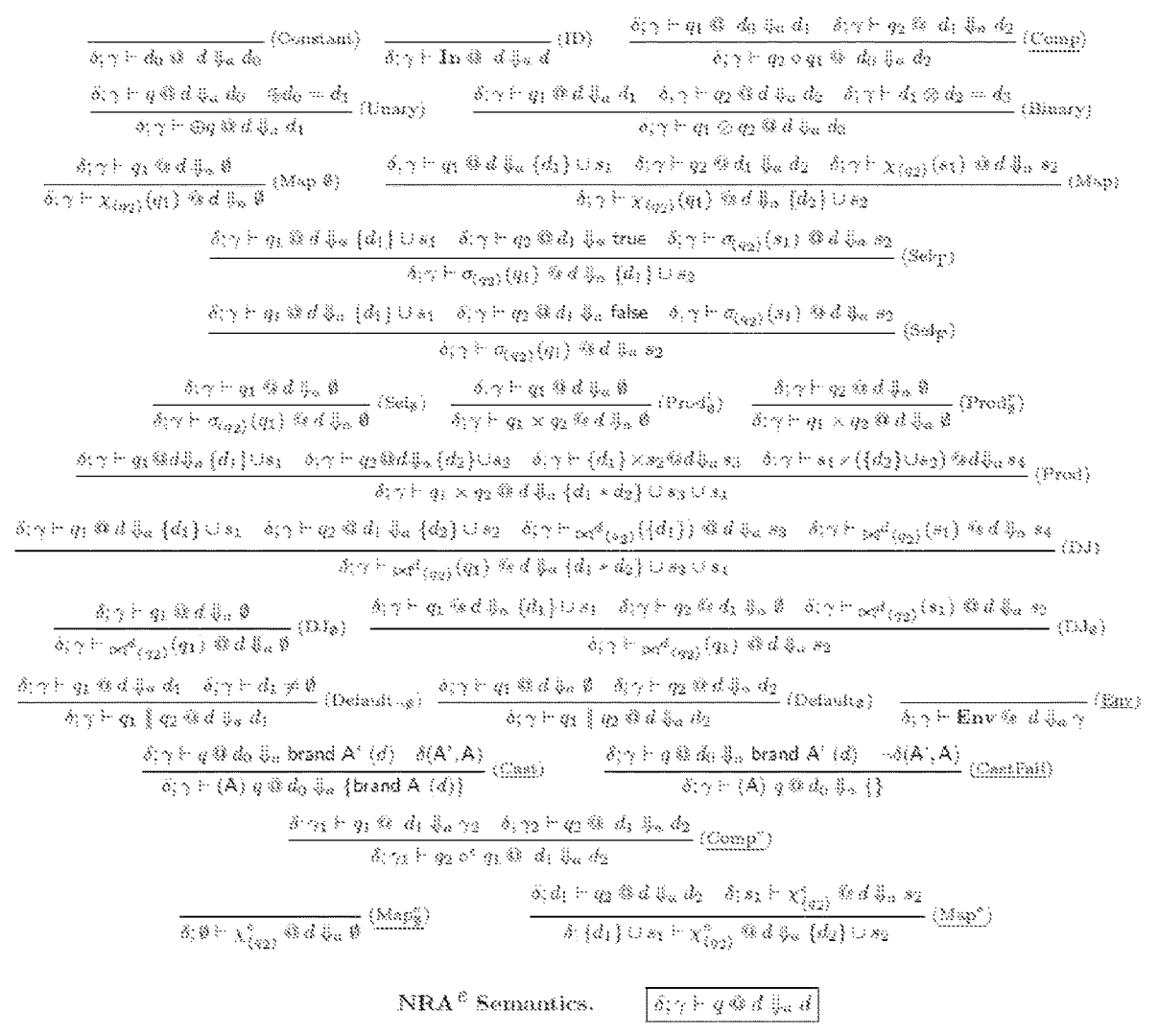

$q ::= d | \text{In} | q_2 \circ q_1 | \oplus q | q_1 \otimes q_2 | \chi_{\{q_2\}}(q_1)$
$| \sigma_{\{q_2\}}(q_1) | q_1 \times q_2 | \bowtie^d_{\{q_2\}}(q_1) | q_1 \| q_2$
$| (A)q | \text{Env} | q_2 \circ^e q_1 | \chi^e_{\{q\}}$ An operational semantics for $NRA^e$ is shown in FIG. 6 in one embodiment. An equivalent semantics in terms of the nested relational calculus is also shown in FIG. 15. In this example, a big-step operational semantics is chosen for consistency with CAMP. Here, d returns constant data, In returns the context value (usually a bag or a record), and $q_2 \circ q_1$ denotes query plan composition, i.e., it evaluates $q_2$ using the result of $q_1$ as input value. ⊕ and ⊗ are unary and binary operators from the data model. $\chi$ is the map operation on bags, σ is selection, and x is the Cartesian product. The dependent join, $\bowtie^d$, evaluates $q_2$ with its context set to each value in the bag resulting from evaluating $q_1$, then concatenates records from $q_1$ and $q_2$ as in a Cartesian product. The | expression, called default, evaluates its first operand and returns its value, unless that value is Ø, in which case it returns the value of its second operand (as default). Note that other operators important for optimization, notably joins or groupby, can be defined in terms of this core algebra. For example, recall that unary operators include projection over a single tuple, so the standard relational projection is $\chi_{\{\overline{A_i}\}}(q)$. Also, the unnest operator used in the example in Example 1 can be defined (as follows:

$\rho_{B/\{A\}}(q) = \chi_{\{it-A\}}(\bowtie^d \langle \chi_{\{[B:In]\}}^{(it.A)} \rangle(q))$ Classic algebraic rewrites are defined under the assumption that the query plan is executed with a fixed global context (e.g., containing bindings for input tables). In $NRA^e$ in one embodiment, three operators are added to manipulate the environment. Env returns the current environment, which is an additional piece of data. In most cases, it is a record whose fields correspond to variable bindings. $q_2 \circ^e q_1$ is a form of query composition that changes the environment: $q_2$ is evaluated in the environment bound to the value returned by $q_1$. Standard query composition is a let binding for the input data; environment query composition is a let binding for the environment. The last operator, $\chi^e$, is dual to the standard map but it iterates on the environment rather than on the input collection, and is used to handle the result of merging two environments.

From $NRA^e$ to NRA

With $NRA^e$ defined, its relationship to the original NRA is considered. A property includes that $NRA^e$ and NRA share the same expressiveness, which is desirable for two reasons. First, it means we have not inadvertently targeted a more expressive language, which could raise issues for reasoning, type checking or optimization. Second, it means we can translate query plans back to the standard NRA at any point during compilation, e.g., to leverage an existing runtime for execution.

The following defines notations and properties over $NRA^e$ used herein. We use NRA(q) to denote the property that query q does not use any of the environment operators. The set of plans q such that NRA(q) is the standard NRA. We use $I^i(q)$ (resp $I^e(g)$) to denote the property that query plan q does not access the input data (resp. the input environment). The evaluation relation for NRA is as given in previous work, A. Shinnar, J. Siméon, and M. Hirzel. A pattern calculus for rule languages: Expressiveness, compilation, and mechanization. In 29th European Conference on Object-Oriented Programming, ECOOP 2015, Jul. 5-10, 2015, Prague, Czech Republic, pages 542-567, 2015, straightforwardly extended to support brand casts As a direct extension to the NRA, $NRA^e$ is at least as expressive as the NRA. This is validated by Theorem 1 below.

Theorem 1 (NRA to Correctness):

$\forall q, NRA(q)$ implies that $\forall \gamma$, $\delta;\gamma \vdash q@d_1 \Downarrow_a d_2 \Leftrightarrow \delta \vdash q@d_1 \Downarrow_n d_2$ where $\delta \vdash q@d_1 \Downarrow_n d_2$ is the evaluation relation for NRA defined in A. Shinnar, J. Siméon, and M. Hirzel. A pattern calculus for rule languages: Expressiveness, compilation, and mechanization. In 29th European Conference on Object-Oriented Programming, ECOOP 2015, Jul. 5-10, 2015, Prague, Czech Republic, pages 542-567, 2015.

The converse is also true: every expression in $NRA^e$ can be captured in the NRA. The proof relies on a direct translation from $NRA^e$ to NRA, which is shown on FIG. 7 in one embodiment. We encode $NRA^e$ expressions as NRA expressions over a record with two fields: D for the input datum, and E for the environment. Unsurprisingly, the translation in FIG. 7 re-introduces some of the nesting and complexity that was eliminated by supporting environments in $NRA^e$. The correctness of the translation is established by Theorem 2.

Theorem 2 (to NRA Correctness):

$\delta;\gamma \vdash q@d_1 \Downarrow_a d_2 \Leftrightarrow \delta \vdash q_a@([E:\gamma]*[D:d_1]) \Downarrow_n d_2$ Corollary 1 (Expressiveness) $NRA^e$ has the same expressiveness as the nested relational algebra and named nested relational calculus.

From CAMP to $NRA^e$

FIG. 8 presents the translation from CAMP to $NRA^e$ instead of NRA. The translation preserves the distinction between input data being matched against and environment. To encode the notion of recoverable errors, the output is always a bag. This bag is guaranteed to be either empty (representing a recoverable error) or a singleton of the data.

The translation is explained starting with the simpler cases, not in the order presented. The rule for constants is trivial. The translations of it and env simply return the input data or the environment which is reified as a record. Unary and binary operators ensure proper error propagation by taking advantage of the invariant that the returned data is a bag with zero or one elements. Mapping an operation over such a bag evaluates it on the data if present, and propagates the error otherwise (mapping Ø to Ø). Binary operators store the two partial results in a record, then extract the components and apply the operator.

The translation for cast A is similar to that of an unary operator, except for the fact that it is not necessary to wrap the result in a collection as this is handled by the corresponding cast in $NRA^e$. The translations of assert and orElse $(p_1|p_2)$ take advantage of the translation mapping err to Ø. The selection operator is used for assert, along with a map that, in case of success, replaces true with the expected empty record.

The translation of map p produces a corresponding map in $NRA^e$, but uses a flattening to account for the fact that the result of translating p will returns a collection. The translation for let it=$p_1$ in $p_2$ uses a map to pass the result of the translation of $p_1$ to $p_2$. The translation for let env is only one making use of environment operations in $NRA^e$ and is the most involved. The first part (on the righthand side of $\circ^e$) computes the merged environment. Flattening is used to account for the fact that the merge operator may fail and hence returns a collection. The second part computes the translation for $p_2$ in the new environment, using $\circ^e$ to change the context followed by $\chi^e$ to iterate over it since it is a collection. We can state the main result of correctness for that translation.

Theorem 3 (CAMP to $NRA^e$ Correctness)

$\delta;\gamma \vdash p@d_1 \Downarrow_r d_2 \Leftrightarrow \delta;\gamma \vdash [|p|]_r@d_1 \Downarrow_a \{d_2\}$ $\delta;\gamma \vdash p@d_1 \Downarrow_r err \Leftrightarrow \delta;\gamma \vdash [|p|]_r@d_1 \Downarrow_a \emptyset$ The theorem has two parts, showing that the translation preserves both match success as a singleton bag, and match failure as an empty bag.

Optimization

The following describes the rewriting properties of $NRA^e$ which provide the foundations for an optimizer in one embodiment of the present disclosure.

Equivalences and Rewrites

Before proceeding with rewrites, the classic notion of algebraic equivalence is extended to include environments. In one embodiment, the semantic of equivalences used to define and prove correctness follows the classic notion of strong equivalence as defined in A. V. Aho, Y. Sagiv, and J. D. Ullman. Efficient optimization of a class of relational expressions. ACM Transactions on Database Systems (TODS), 4(4):435-454, 1979 (rather than weak equivalence).

Definition 4 (Equivalence) Given a brand derivation hierarchy δ, two plans $q_1$ and $q_2$ are equivalent iff for any environment γ and input data d, evaluating $q_1$ and $q_2$ over data d in environment γ returns the same value. I.e., $q_1 \equiv q_2 \Leftrightarrow \forall \gamma, \forall d, (\delta;\gamma \vdash q_1@d) = (\delta;\gamma \vdash q_2@d)$ As in most database optimizers, the present disclosure may consider rewriting for well-typed algebraic plans. In the present context, focus may be placed on directed equivalences, where the direction indicates the way those are used in the optimizer. Type checking definition may remain informal.

Definition 5 (Typed Rewrites) We say that query plan $q_1$ correctly rewrites to query plan $q_2$, written $q_1 \Rightarrow q_2$ iff, given a well-typed $q_1$, then $q_2$ is also well typed, and for all well-typed input data and environment, they return the same value.

As in the relational context, plan equivalence implies typed rewrites but not the opposite. An implementation in one embodiment of the present disclosure may include a full type checker. The correctness proofs for all the rewrites used in the optimizer may be verified for both untyped and typed cases (depending on the specific rewrites).

Lifting NRA Rewrites

A property of $NRA^e$ is the ability to reuse existing known equivalences for the NRA. This is actually a strong result since we allow lifting equivalences over query plans that may contain environment manipulation, at the condition that the original NRA equivalence does not observe the content of the underlying query plan. To illustrate that idea, consider a simple selection pushdown equivalence from the relational literature:

$$\sigma_{\{q_1\}}(\sigma_{\{q_2\}})q_3)) = \sigma_{\{q_2\}}(\sigma_{\{q_1\}}(q_3))$$

In the relational context, $q_1$ and $q_2$ are predicates, and in the NRA context they are arbitrary query plans returning a boolean value. The lifting result shows that if such an equivalence is true for any well typed $q_1$, $q_2$, $q_3$ in the NRA, then it is also true for any well typed $q_1$, $q_2$, $q_3$ in the $NRA^e$.

That result relies on the fact that the NRA equivalences are effectively a form of parametric polymorphism in terms of $q_1$, $q_2$, $q_3$. To properly express this result, we need a stronger notion of equivalence which is parametric, and that we call contextual equivalence. We first define a notion of contextual plan for both the NRA and $NRA^e$, which is a query plan with plan variables and a notion of contextual plan instantiation. We use the set $PV=\{\$q_1, \ldots \$q_n\}$ to denote plan variables.

Definition 6 (Contextual Plan) We say that c is contextual plan over plan variables $\$q_1, \ldots, \$q_n$, if it is an expression in the NRA (resp. $NRA^e$) grammar extended with plan variables $\$q_1, \ldots, \$q_n$.

Example 2 $\sigma_{\{\$q_1\}}(\sigma_{\{\$q_2\}}(\$q_3))$ denotes a contextual plan over plan variables $\$q_1$, $\$q_2$, $\$q_3$.

Definition 7 (Plan Instantiation) Given c, a contextual NRA (resp. $NRA^e$) plan over plan variables, $\$q_1, \ldots, \$q_n$, the instantiation of c over $q_1, \ldots, q_n$, denoted $c[q_1, \ldots q_n]$ is the NRA (resp. $NRA^e$) plan q obtained by substituting $\$q_1$ by $q_i$ in c.

A notion of contextual equivalence is defined, which states that two contextual plans are equivalent if every plan instantiation for those two contextual plans are equivalent.

Definition 8 (Contextual equiv.) Given two contextual NRA (resp. $NRA^e$) plans $c_1$ and $c_2$ over $\$q_1, \ldots, \$q_n$, we say that they are contextually equivalent iff, for every NRA (resp. $NRA^e$) plans $q_1, \ldots, q_n$:

a. $c_1[q_1, \ldots, q_n] \equiv c_2[q_1, \ldots, q_n]$

We use $c_1 \equiv_c c_2$ and $c_1 \equiv_c^e c_2$ to denote contextual equivalence for the NRA and $NRA^e$ respectively.

Example 3. The following contextual equivalence holds for the NRA:

a. $\sigma_{\{\$q_1\}}(\sigma_{\{\$q_2\}}(\$q_3)) \equiv_c \sigma_{\{\$q_2\}}(\sigma_{\{\$q_1\}}(\$q_3))$ Most relational or nested relational equivalences are contextual in the sense given here, but the literature tends to rely on the simpler notion of equivalence for simplicity. However this distinction precisely states the following key lifting result.

Theorem 4 (Equiv. Lifting) Every contextual NRA equivalence is also a contextual $NRA^e$ equivalence:

$$c_1 \equiv c_2 ==> c_1 \equiv_c^e c_2$$

This result and corresponding proof are non-trivial. In one embodiment, every NRA operator is also an $NRA^e$ operator. This means the theorem statement is well-formed in the sense that the operators in $c_1$ and $c_2$ are also $NRA^e$ operators that can be used on the righthand side. The proof fundamentally relies on the ability to translate $NRA^e$ back to NRA (Theorem 2). It also relies on the fact that the rest of the query plan in the equivalence cannot change the environment. The instantiated $NRA^e$ expressions can locally interact with the environment, but any modifications are contained. The proof can therefore treat the environment as mostly constant.

$NRA^e$ Rewrites

The following reviews classes of rewrites used for optimizing plans resulting from rules compilation. Table 1 lists those rewrites, using a rough classification to facilitate exposition. The following explains their general purpose, based on that classification. Those rewrites fall into two broad categories: (i) rewrites useful to simplify combination of operators that result from handling match failure/success, (ii) rewrites useful to simplify environment manipulation. Another distinction is whether they are equivalence lifted from NRA using the formal result presented, or whether they are rewrites that only apply to $NRA^e$.

Going over Table 1 with those distinctions in mind, the first four sections which are entitled: record, flatten, map and composition pushdown rewrites, are all lifted from NRA (to the exception of the composition pushdown over Env and the last flatten rewrite over $\chi^e$). Although they appear to be new from the literature on NRA optimizations, their proofs are usually relatively straightforward. All the subsequent sections involve environment manipulation and are specific to $NRA^e$.

Record rewrites are simple normalization of record operations, but they attempt to convert merge operations into regular record concatenation. Most of the rewrites falling in the flatten and map category focus on collapsing combinations of iterators that involve singleton collections into bulk processing on collections. I.e., they attempt to turn nested match/failure processing into simpler relational plans over whole collections.

The following two categories of composition push down are central to the processing of the context and in fact correspond to changing the scope for either the current value or the environment. The general idea here is to push down the context close to the place where it is being used in order to eliminate it, which happens when the composition reaches a leaf. For instance if $\circ^e$ gets pushed down all the way to an In it can simply be eliminated since in fact the environment is not being used. Many of the rewrites for environment push down involve side conditions about whether a sub-plan ignores the context data ($I^i(q)$) or the environment ($I^e(q)$) for which the proof of correctness is more involved. Those rewrites optimize the plans resulting from rules translation in the compiler of the present disclosure in one embodiment. The last three categories of rewrites focus on cases when either environment access or iteration can be eliminated. The last four of those may be isolated in the complex category as they appear ad hoc. They may be generalized or simplified.

TABLE 1

Rewrites for $NRA^e$

Record rewrites
$q+[\,] \Rightarrow \{q\}$
$[a:q] \cdot a \Rightarrow q$
$([a_1:q_1]*[a_2:q_2]) \cdot a_2 \Rightarrow q_2$
if $a_1 \neq a_2, ([a_1:q_1]*[a_2:q_2]) \cdot a_1 \Rightarrow q_1$
$\{[a_1:q_1]\} \times \{[a_2:q_2]\} \Rightarrow \{[a_1:q_1]*[a_2:q_2]\}$
if $a_1 \neq a_2, [a_1:q_1]+[a_2:q_2] \Rightarrow \{[a_1:q_1]*[a_2:q_2]\}$
if $a_1 \neq a_2, [a_1:q_1]+([a_1:q_1]*[a_2:q_2]) \Rightarrow \{[a_1:q_1]*[a_2:q_2]\}$
flatten rewrites
flatten($\{q\}$) $\Rightarrow$ q
flatten($\chi\langle\{q_1\}\rangle(q_2)$) $\Rightarrow \chi\langle q_1\rangle(q_2)$
flatten($\chi\langle\sigma\langle q_1\rangle(\{In\})\rangle(q_2)$) $\Rightarrow \sigma\langle q_1\rangle(q_2)$
flatten($\chi\langle\chi\langle\{q_3\}\rangle(q_1)\rangle(q_2)$) $\Rightarrow \chi\langle q_3\rangle$(flatten($\chi\langle q_1\rangle(q_2)$))
flatten($\chi\langle\sigma\langle q_1\rangle(\{q_2\})\rangle(q_3)$) $\Rightarrow \sigma\langle q_1\rangle(\chi\langle q_2\rangle(q_3))$
flatten($\chi\langle\chi\langle q_1\rangle(\sigma\langle q_2\rangle(\{In\}))\rangle(q_3)$) $\Rightarrow \chi\langle q_1\rangle(\sigma\langle q_2\rangle(q_3))$
flatten($\chi^e\langle\{q_1\}\rangle$) $\Rightarrow \chi^e\langle q_1\rangle$
$\chi$ rewrites
$\chi\langle In\rangle(q) \Rightarrow q$
$\chi\langle q_1\rangle(\chi\langle q_2\rangle(q)) \Rightarrow \chi\langle q_1 \circ q_2\rangle(q)$
$\chi\langle q_1\rangle(\{q_2\}) \Rightarrow \{q_1 \circ q_2\}$
$\chi\langle q_2\rangle(\sigma\langle q_1\rangle(\{q\})) \Rightarrow \chi\langle q_2 \circ q\rangle(\sigma\langle q_1 \circ q\rangle(\{In\}))$
$\circ$ Pushdown
$d \circ q \Rightarrow d$
Env $\circ$ q $\Rightarrow$ Env
$q \circ In \Rightarrow q$
$In \circ q \Rightarrow q$
$(\oplus(q_1)) \circ q_2 \Rightarrow \oplus(q_1 \circ q_2)$
$(q_2 \otimes q_1) \circ q \Rightarrow (q_2 \circ q) \otimes (q_1 \circ q)$
$\chi\langle q_1\rangle(q_2) \circ q \Rightarrow \chi\langle q_1\rangle(q_2 \circ q)$
$\sigma\langle q_1\rangle(q_2) \circ q \Rightarrow \sigma\langle q_1\rangle(q_2 \circ q)$
$(q_1 \circ q_2) \circ q_3 \Rightarrow q_1 \circ (q_2 \circ q_3)$
$\circ^e$ Pushdown
$d \circ^e q \Rightarrow d$
$In \circ^e q \Rightarrow In$
$Env \circ^e q \Rightarrow q$
$q \circ^e Env \Rightarrow q$
$(\oplus(q_1)) \circ^e q_2 \Rightarrow \oplus(q_1 \circ^e q_2)$
$(q_1 \otimes q_2) \circ^e q \Rightarrow (q_1 \circ^e In) \otimes (q_2 \circ^e q)$
if $I^i(q), \chi\langle q_1\rangle(q_2) \circ^e q \Rightarrow \chi\langle q_1 \circ^e q\rangle(q_2 \circ^e q)$
if $I^i(q), \sigma\langle q_1\rangle(q_2) \circ^e q \Rightarrow \sigma\langle q_1 \circ^e q\rangle(q_2 \circ^e q)$
$(q_1 \circ^e q_2) \circ^e q \Rightarrow q_1 \circ^e (q_2 \circ^e q)$
if $I^e(q_1), q_1 \circ^e q_2 \Rightarrow q_1$
if $I^e(q_1), (Env+q_1) \circ^e q \Rightarrow q+q_1$
Env removal
$\chi\langle Env\rangle(\sigma\langle q\rangle(\{In\})) \circ^e In \Rightarrow \sigma\langle q\rangle(\{In\}) \circ^e In$
if $I^e(q_1), \chi\langle Env\rangle(\sigma\langle q_1\rangle(\{In\})) \circ^e q_2 \Rightarrow$
$\chi\langle q_2\rangle(\sigma\langle q_1\rangle(\{In\}))$
$\sigma\langle q\rangle(\{In\}) \circ^e In \Rightarrow \sigma\langle q \circ^e In\rangle(\{In\})$
$\chi^e$ Removal
$\chi^e\langle Env\rangle \circ q \Rightarrow Env$
$\chi^e\langle q_1\rangle \circ^e \{q_2\} \Rightarrow \{q_1 \circ^e q_2\}$
if $I^i(q_1), \chi^e\langle q_1\rangle \circ^e q_2 \Rightarrow \chi\langle q_1 \circ^e In\rangle(q_2)$
Complex rewrites
flatten($\chi^e\langle\chi\langle Env\rangle(\sigma\langle q_1\rangle(\{In\}))\rangle) \circ^e \chi\langle Env\rangle$
$(\sigma\langle q_2\rangle(\{In\})) \Rightarrow \chi\langle Env\rangle(\sigma\langle q_1\rangle(\sigma\langle q_2\rangle(\{In\})))$
$(\chi^e\langle q\rangle) \circ^e (Env+[a:In]) \Rightarrow \chi\langle(q \circ Env.a) \circ^e In\rangle(Env+[a:In])$
flatten($\chi^e\langle q\rangle) \circ^e (Env+[a:In]) \Rightarrow$ flatten($\chi\langle(q \circ Env.a) \circ^e In\rangle$
$(Env + [a:In]))$
$\chi\langle Env+In\rangle(\sigma\langle q_1\rangle(Env+q_2)) \Rightarrow$
$\chi\langle\{In\}\rangle(\sigma\langle q_1\rangle(Env + q_2))$ Experiments The following describes a compiler implementation and report both on rule coverage and on query plan complexity.

Implementation

An implementation in one embodiment supports the full compilation pipeline shown in FIG. 4. The compiler may be implemented with the Coq proof assistant and may be used to guarantee correctness. In one embodiment, an end-to-end compiler is obtained by: (1) extracting code from the Coq source (Coq supports several target languages; e.g., Ocaml), and (2) interfacing the front-end and backend phases with the resulting extracted code.

The front-end phase, for example, may be written in Java and translates a number of rule languages to CAMP. These may include JRules and a related aggregate rules language (informally, agg) with a syntax in controlled English. Trend is seen, for example, in that rule languages incorporate more and more query-like functionality. The CAMP output of this translation is supplemented by additional Coq directives that invoke the core compiler. To aid in evaluation, the front-end also runs the production JRules or agg engine against provided working memory and saves the results for comparison.

The back-end phase generates code for plain JavaScript (e.g., tested using the Rhino component of JAVA 7) and for map-reduce under Spark, which is then linked with a small library (implementing the basic operators described above) for execution. A third back-end may be provided for Cloudant or like database platform. A relatively small JAVA harness may handle details of each target environment and may be responsible for combining all the compilation phases. Since the initial JAVA translation from rule languages to CAMP is not part of the Coq formalization, it is verified that the compiler produces the same result as a rules engine: a compilation is only correct if its execution produces the same results as the rules engine on the same working memory. Combining the proofs of correctness for the core compiler with (empirical) end-to-end testing provides a high level of confidence in the implementation.

Expressiveness and Coverage

Most commonly used benchmarks for production rules do not yet include support for recent rules extensions such as aggregation, and focus instead on interactions resulting from the actions part of the rules language. As a result, microbenchmark is designed whose purpose is to evaluate various features of the rules language when combined with aggregation and with different object models.

The micro-benchmark is a mixture of JRules rules and employs three different business object models. The first object model includes the simple classes Customer and Purchase which can be joined by customer id (which appears in both). The second object model is synthetic, and the third one features a more elaborate type hierarchy with subclassing.

The tests fall into the following categories: simple selection (2 tests), simple join (1 test), join with negation (2 tests), simple aggregations (11 tests), join with aggregation (8 tests). Sample when clauses corresponding to those various categories are given below that show test classes.

Selection c:Customer(age==32)
Join c:Customer( ); p:Purchase(cid==c.cid);
Join+negation c:Customer( ); not p:Purchase(cid==c.cid);
Aggregation pu: aggregate {p:Purchase( );} do {count {p};}
Join+aggregation c:Customer( ); pu: aggregate {p:Purchase (cid==c.cid);} do {count {p};}

Among those tests, one also exercises reference lookup features from JRules and two exercise the details of the class hierarchy (i.e., described using the notion of brand).

Of the simple aggregation rules, many are written in agg. An example of that syntax is shown here. Agg rules can do counts, sums, averages, minima and maxima.

the number of Customers,
where the age of each Customer equals 32

The evaluation of coverage includes running all 24 tests through both the JavaScript (Rhino) back-end and the Mapreduce (Spark) back-end. In each case, a self-testing implementation compared the evaluation of the rules using the existing rules engine with the actual output when the result of the compiler of the present disclosure was submitted to Rhino or Spark. The working memory for these tests was of modest size (tens of objects) but chosen to produce meaningful results for comparison.

Query Plan Complexity

To evaluate the effectiveness of the optimizer, both the number of operations in the query plans and the level of nesting is measured. Table 2 provides results for a representative rule in each class. The number of operations involved in the plan gets drastically reduced in all those tests, up to 25 times from the naive NRA translation, with between 2 to 5 times less deeply nested plans. A large part of the improvement in the number of operators results from translating to $NRA^e$ itself, while most of the improvements in nesting depths is a result of the optimization. The most complex query supported (Query 2) also shows the most improvements with the original translation having 10k operators and nesting level 31 and the optimized version having 373 operators and nesting depth 22.

TABLE 2

| Rule kind | NRA | | $NRA^e$ | | $NRA^e$ (Optim) | |
| --- | --- | --- | --- | --- | --- | --- |
| | # Ops | # Depth | # Ops | # Depth | # Ops | # Depth |
| Selection | 844 | 7 | 163 | 6 | 24 | 1 |
| Join | 1766 | 11 | 342 | 10 | 69 | 5 |
| Join + negation | 1716 | 11 | 332 | 10 | 73 | 7 |
| Aggregation | 1655 | 9 | 318 | 8 | 68 | 3 |
| Join + aggregation | 2376 | 12 | 455 | 11 | 106 | 4 |

The compiler and methodology of the present disclosure in one embodiment may target modern business rules such as JRules and Drools, which have their roots in production systems. In one embodiment, database techniques may be integrated directly within an existing rules engine. The methodology of the present disclosure may work in a context where the source language is more declarative and features complex pattern-matching primitives. The compiler and methodology of the present disclosure offer a formal treatment for an extension of the relational algebra with environment manipulation.

The present disclosure presents techniques for the effective database compilation, with example of the querying subset of business rules. $NRA^e$ is presented that provides an extension of the nested relational algebra that facilitates reasoning and optimization for languages with complex environment manipulation. This is by no means a characteristic unique to rules languages and the approach is effective for other query languages such as XQuery or SPARQL. Properties of $NRA^e$ show that it has the same expressiveness as the standard NRA and how to lift existing NRA optimization plans into $NRA^e$ are presented. The effectiveness of this approach is demonstrated on an end-to-end compiler from business rules to Spark. The compiler is extracted from a specification built with the Coq proof assistant, and includes a mechanized proof of the compiler's correctness. The front-end side may be further improved by extending the subset of rules being covered, and to use another source language. The back-end side may be improved to generate efficient map/reduce plans for a broader class of rules and to provide tighter integration with an analytics platform such as Spark.

Figure 9:
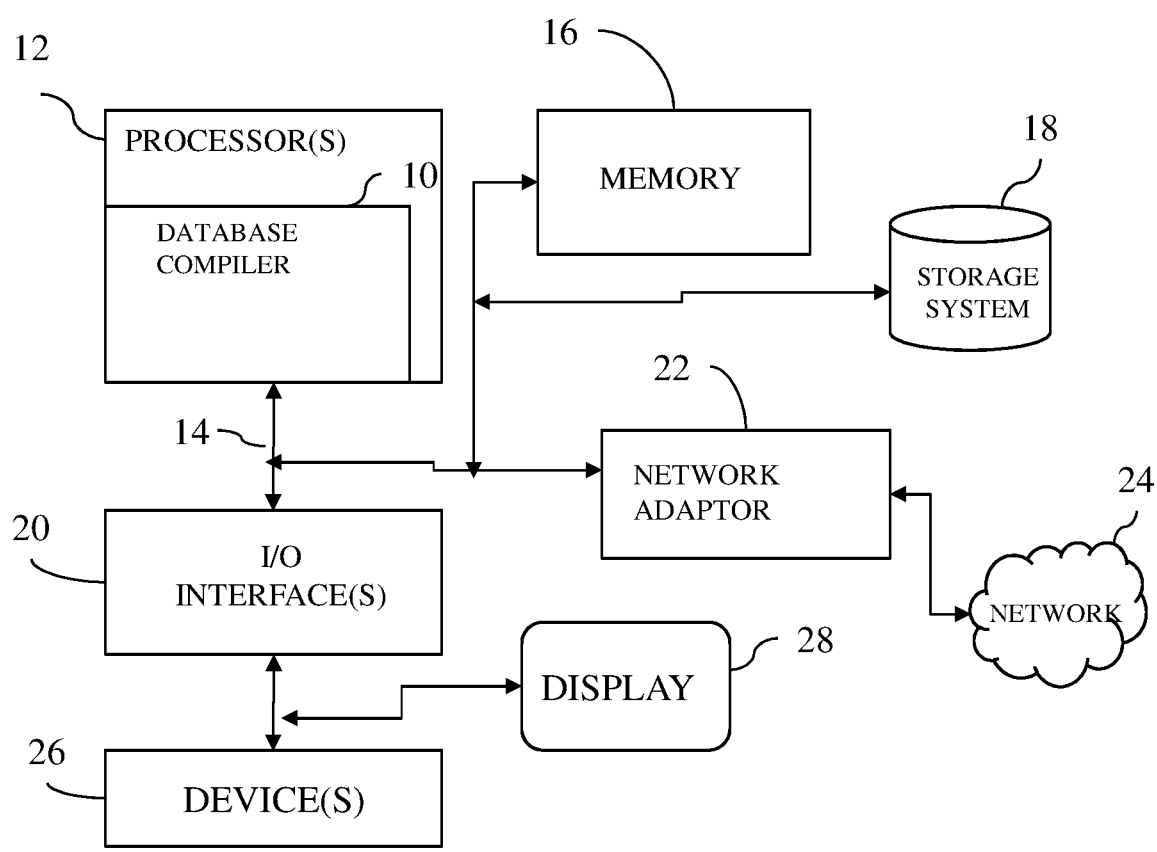
FIG. 9 illustrates a schematic of an example computer or processing system that may implement a database compiler in one embodiment of the present disclosure.

FIG. 9 illustrates a schematic of an example computer or processing system that may implement a database compiler system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

APPENDIX

NRA

This appendix presents the formal definition of some of the concepts introduced above in "From NRA$^e$ back to NRA", and formally defines properties of NRA expressions and introduces an operational semantics for NRA.

NRA subset of NRA

FIG. 10 presents the NRA(q), which holds for queries which do not use any of the environment operators in one embodiment.

Properties of NRA expressions

FIG. 11 presents $I^i(q)$, which identifies queries q which do not access the input data (In) in one embodiment. FIG. 12 presents $I^e(q)$, which identifies queries q which do not access the input environment (Env) in one embodiment.

Semantics

FIG. 13 presents an operational semantics for NRA in one embodiment. The semantics are taken from A. Shinnar, J. Simeon, and M. Hirzel. A pattern calculus for rule languages: Expressiveness, compilation, and mechanization. In 29th European Conference on Object-Oriented Programming, ECOOP 2015, Jul. 5-10, 2015, Prague, Czech Republic, pages 542-567, 2015, and extended with two new rules to handle the new brand cast operation.

NRA$^e$ to NNRC

This documents the translation from NRA$^e$ to the named nested relational calculus (NNRC), used internally as part of the code-generation.

Named Nested Relational Calculus

A sufficiently large set of variables $\{x, y, \ldots\}$ may be assumed. The calculus is similar to the one used in J. Van den Bussche and S. Vansummeren. Polymorphic type inference for the named nested relational calculus. Transactions on Computational Logic (TOCL), 9(1), 2007, with a bag of semantics.

Definition 9 (NNRC syntax)

(exprs) e::=x|d|⊕$e_1$|$e_1$ ⊗ $e_2$|let x=$e_1$ in $e_2$
|$\{e_2|x \in e_1\}$|$e_1$ ? $e_2$:$e_3$ In this grammar, x is a variable, d is constant data and ⊕ and ⊗ are unary and binary operators, as defined. The let expression allows for dependent sequencing: expression $e_1$ is evaluated and its result bound to x in the environment, which is then used to evaluate $e_2$. The bag comprehension $\{e_2|x \in e_1\}$ first evaluates expression $e_1$, producing a bag, then expression $e_2$ is evaluated with x bound to the current element. The result of the comprehension is a bag of these results. The conditional $e_1$? $e_2$:$e_3$ first evaluates $e_1$; if the result is true, it evaluates $e_2$, otherwise it evaluates $e_3$.

A denotational semantics is given to the NNRC in FIG. 14 in one embodiment, given an environment a which is a mapping from a finite set of variables to values. We write (x:d,σ) for the environment a extended with variable x mapped to data d. We define the judgment σ⊢e⇓$_c$d to mean: under environment σ, expression e evaluates to d.

The rule for variables looks up the given variable in the environment and returns the associated data. Constant expressions return the given constant, irrespective of the environment. Unary and binary operator expressions evaluate the given expressions in the current environment, and then apply the given operator to the results.

Let expressions evaluate the first expression in the current environment and then evaluate the second expression in an environment enriched with a binding from the given variable to the result of evaluating the first expression.

Comprehensions, $\{e_2|x \in e_1\}$, are similar to let expressions, except that $e_1$ returns a bag, and $e_2$ is evaluated with x bound to each element of that bag in turn. Rule For encodes this recursion, evaluating $e_1$ and then picking an element of the resulting bag and running $e_2$ on it. The result is unioned with the evaluation of a comprehension of $e_2$ over the remainder of the bag. Rule For Ø enables this recursion to terminate.

The rules for the final type of expression, $e_1$ ? $e_2$:$e_3$, or conditional, are straightforward. The first expression is evaluated and its result used to determine which branch to evaluate.

Translation

FIG. 15 gives a complete translation from NRA$^e$ to NNRC. NRA$^e$ queries operate over an input value (In), in the context of an environment (Env) in one embodiment. In contrast, NNRC expressions have only an environment and no implicit data. The semantics for NRA$^e$ queries to NNRC expressions is written for two given variables, one containing the input value ($x_i$ in FIG. 15), and the other containing the environment, reified as a record ($x_e$ in FIG. 15). To simplify the presentation, we assume that we have a way to generate sufficiently fresh variables (variables that are distinct from any other variables used in the expression). We call such variables 'fresh'.

We claim:

1. A computer-implemented method of developing a database compiler with environment support, comprising:
   extending database operators in a database compiler for native environment support to include environment as an input parameter in addition to input data, the environment comprising a global parameter associated with a computer database environment; and
   adding to the database compiler, environment operators that perform one or more of accessing and modifying the environment,
   the database compiler compiling a query language into a database algebra supporting the environment, the database compiler operable to translate the environment into a record whose fields correspond to variable bindings, wherein an existing environment is merged with the variable bindings and replaced in remainder of a query being compiled,
   wherein for rewriting a query for optimization, the database compiler employs a first set of rewrites, which tackles error propagation and involves combinations of map, flatten, and operations on collections, and a second set of rewrites, which tackles environment manipulation and involves environment push-downs and projecting out unused variable bindings,
   wherein the database compiler supports rewriting operations comprising map and flatten operations to collapse combinations of iterators that involve singleton collections into bulk processing on collections.

2. The computer-implemented method of claim 1, wherein the environment operator comprises a return-environment operator.

3. The computer-implemented method of claim 1, wherein the environment operator comprises a map-with-environment operator.

4. The computer-implemented method of claim 1, wherein the environment operator comprises a compose-with- environment operator.

5. The computer-implemented method of claim 1, wherein the database compiler compiles the query language into a nested algebra that supports the environment.

6. The computer-implemented method of claim 5, further comprising adding rewrites to optimization operations over the environment in the nested algebra.

7. A computer readable storage medium storing a program of instructions executable by a machine to perform a method of compiling a query language by a database compiler with environment support, comprising:
   receiving a query language by one or more computer processors;
   compiling, by one or more of the computer processors, the query language into a database algebra with environment support, the database algebra with environment support operable to handle an input parameter comprising a global parameter associated with a computer database environment;
   rewriting, by one or more of the computer processors, the database algebra with environment support to optimize the database algebra; and
   generating, by one or more of the computer processors, a backend code from the database algebra that is optimized,
   wherein the backend code is operable to run on a database runtime having no environment support,
   the database compiler operable to translate the environment into a record whose fields correspond to variable bindings, wherein an existing environment is merged with the variable bindings and replaced in remainder of a query being compiled,
   wherein for rewriting a query for optimization, the database compiler is operable to employ a first set of rewrites, which tackles error propagation and involves combinations of map, flatten, and operations on collections, and a second set of rewrites, which tackles environment manipulation and involves environment push-downs and projecting out unused variable bindings,
   wherein the rewriting comprises rewriting operations comprising map and flatten operations to collapse combinations of iterators that involve singleton collections into bulk processing on collections.

8. The computer readable storage medium of claim 7, further comprising deploying and executing the backend code on one or more of the computer processors.

9. The computer readable storage medium of claim 7, wherein the database algebra is extended to include environment operators.

10. The computer readable storage medium of claim 9, wherein the environment operator comprises a return-environment operator.

11. The computer readable storage medium of claim 9, wherein the environment operator comprises a map-with-environment operator.

12. The computer readable storage medium of claim 9, wherein the environment operator comprises a compose-with-environment operator.

13. The computer readable storage medium of claim 7, wherein operators of the database algebra are extended to include environment as input parameter.

14. The computer readable storage medium of claim 7, wherein the rewriting comprises manipulating the environment and projecting unused variable bindings.

15. A database compiler system, comprising:
   one or more hardware processors;
   a database compiler operable to execute on one or more of the hardware processors, the database compiler comprising operators extended to include environment as an input parameter, the environment comprising a global parameter associated with a computer database environment, the database compiler further comprising environment operators that perform one or more of accessing and modifying the environment,
   the database compiler further operable to receive a query language,
   the database compiler further operable to compile the query language into a database algebra with environment support;
   the database compiler further operable to rewrite the database algebra with environment support to optimize the database algebra,
   the database compiler further operable to generate a backend code from the database algebra that is optimized,
   wherein the backend code is operable to run on a database runtime having no environment support,
   the database compiler operable to translate the environment into a record whose fields correspond to variable bindings, wherein an existing environment is merged with the variable bindings and replaced in remainder of a query being compiled, wherein for rewriting a query for optimization, the database compiler is operable to employ a first set of rewrites, which tackles error propagation and involves combinations of map, flatten, and operations on collections, and a second set of rewrites, which tackles environment manipulation and involves environment push-downs and projecting out unused variable bindings, wherein the database compiler supports rewriting operations comprising map and flatten operations to collapse combinations of iterators that involve singleton collections into bulk processing on collections.

16. The database compiler system of claim 15, wherein the environment operator comprises a return-environment operator.

17. The database compiler system of claim 15, wherein the environment operator comprises a map-with- environment operator.

18. The system of claim 15, wherein the environment operator comprises a compose-with- environment operator.

* * * * *